(12) United States Patent
Ishigure et al.

(10) Patent No.: US 10,465,054 B1
(45) Date of Patent: Nov. 5, 2019

(54) PRODUCTION METHOD FOR GI OPTICAL WAVEGUIDE

(71) Applicant: NISSAN CHEMICAL INDUSTRIES, LTD., Tokyo (JP)

(72) Inventors: Takaaki Ishigure, Mitaka (JP); Sho Yoshida, Adachi-ku (JP); Yuki Saito, Funabashi (JP); Kazuki Yasuhara, Yokohama (JP); Takehiro Nagasawa, Funabashi (JP); Kentaro Ohmori, Funabashi (JP)

(73) Assignee: NISSAN CHEMICAL CORPORATION, Tokyo (JP)

( * ) Notice: Subject to any disclaimer, the term of this patent is extended or adjusted under 35 U.S.C. 154(b) by 81 days.

(21) Appl. No.: 15/770,294

(22) PCT Filed: Oct. 21, 2016

(86) PCT No.: PCT/JP2016/081320
§ 371 (c)(1),
(2) Date: Apr. 23, 2018

(87) PCT Pub. No.: WO2017/069259
PCT Pub. Date: Apr. 27, 2017

(30) Foreign Application Priority Data

Oct. 21, 2015 (JP) .................................. 2015-207586

(51) Int. Cl.
*B29D 11/00* (2006.01)
*C08J 7/04* (2006.01)
(Continued)

(52) U.S. Cl.
CPC ......... *C08J 7/042* (2013.01); *B29D 11/00663* (2013.01); *B29D 11/00673* (2013.01);
(Continued)

(58) Field of Classification Search
CPC ......... B29D 11/00673; B29D 11/00663; C08J 7/042; G02B 6/13
See application file for complete search history.

(56) References Cited

U.S. PATENT DOCUMENTS

| | | | | |
|---|---|---|---|---|
| 2014/0051821 | A1* | 2/2014 | Popall | C08G 77/20 528/26 |
| 2016/0252816 | A1* | 9/2016 | Mikami | B29D 11/00663 430/321 |
| 2018/0305488 | A1* | 10/2018 | Nagasawa | C08F 230/08 |

FOREIGN PATENT DOCUMENTS

| | | |
|---|---|---|
| JP | 2012-198488 A | 10/2012 |
| JP | 2014-510159 A | 4/2014 |

(Continued)

OTHER PUBLICATIONS

Jan. 17, 2017 Search Report issued in International Patent Application No. PCT/JP2016/081320.
(Continued)

*Primary Examiner* — Mathieu D Vargot
(74) *Attorney, Agent, or Firm* — Oliff PLC

(57) ABSTRACT

A production method for an optical waveguide including: a first step of inserting a needle-like portion at a tip end of an ejection unit into uncured cladding; a second step of moving the needle-like portion in the uncured cladding while ejecting an uncured material from the needle-like portion to form an uncured core surrounded and covered with the uncured cladding; a third step of removing the needle-like portion from the uncured cladding; and a fourth step of curing the uncured cladding and core, wherein the uncured cladding is composed of a composition including a reactive silicone compound composed of a polycondensate of a diarylsilicic acid compound of Formula [1]

(Continued)

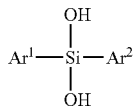

[1]

and an alkoxy silicon compound of Formula [2]

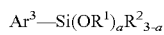

[2]

and a di(meth)acrylate compound of Formula [3]

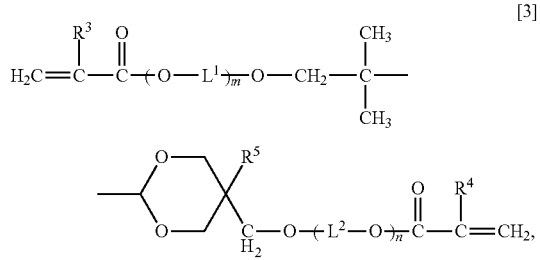

[3]

and the uncured core is composed of a composition including a reactive silicone compound and an aromatic vinyl compound of Formula [4]

$$L^3 \!-\!\!\left[\text{Ar}^4 \!-\!\!\left(\!\!\begin{array}{c} R^6 \\ | \\ C \!=\! CH_2 \end{array}\!\!\right)_{\!p}\right]_{\!q}.$$

[4]

2 Claims, 8 Drawing Sheets

(51) Int. Cl.
G02B 6/13 (2006.01)
B29K 83/00 (2006.01)
G02B 6/12 (2006.01)

(52) U.S. Cl.
CPC .......... G02B 6/13 (2013.01); *B29K 2083/00* (2013.01); *C08J 2383/07* (2013.01); *C08J 2483/07* (2013.01); *G02B 2006/12095* (2013.01)

(56) References Cited

FOREIGN PATENT DOCUMENTS

WO 2013/002013 A1 1/2013
WO 2015/060190 A1 4/2015

OTHER PUBLICATIONS

Jan. 17, 2017 Written Opinion issued in International Patent Application No. PCT/JP2016/081320.

\* cited by examiner

PRODUCTION METHOD FOR GI OPTICAL WAVEGUIDE

TECHNICAL FIELD

The present invention relates to a production method for a GI optical waveguide, and more specifically to a production method for a GI optical waveguide using a polymerizable composition composed of a certain reactive silicone compound and a di(meth)acrylate compound as optical waveguide-forming materials.

BACKGROUND ART

With recent development of cloud computing and increase of smartphone users, communication traffic is ever-increasing. This requires an enormous amount of electricity in data servers where transmitted information data is gathered. Moreover, their processing capacity is reaching the limit. There is an urgent need for development of technologies for improving such problems. One of the actively studied technologies is opto-electronic circuit boards (also called opto-electronic hybrid boards) which change part of electrical interconnects in a server board to optical interconnects, and this technology enables data processing at high density and at high speed.

The opto-electronic circuit board requires an optical waveguide as an optical transmission path as well as a photoelectric transducer converting an electrical signal into an optical signal. Techniques including vertical cavity surface emitting layers (VCSEL) and silicon photonics are known as light sources for the photoelectric transducer. Especially, silicon photonics developed from an application of semiconductor processes, such as CMOS and MEMS, has become a mainstream. The wavelengths of light transmitted have changed from 850 nm for VCSEL to the long wavelength range, such as the wavelength of 1,310 nm and the wavelength of 1,550 nm, for silicon photonics.

To incorporate electrical interconnects, a solder reflowing process up to about 300° C. is required, and the optical waveguide should have heat resistance to the process.

There is a need for optical waveguides that have a low transmission loss in the above-noted long wavelength range and have heat resistance to 300° C. or higher, and preferably 350° C. or higher. A vinyl-based silicone compound is disclosed as a material that can form such optical waveguides (Patent Document 1).

Optical waveguides are classified in accordance with their structure mainly into two types: step-index (SI) and graded-index (GI) structures. The SI structure has been employed in conventional optical waveguides in view of its processability. In the SI structure, a core and cladding define an interface between refractive indices, and reflection at the interface allows light to propagate. On the other hand, in the GI structure, the refractive index is highest at the core center and gradually decreases outward. This structure allows light to be guided and propagate only in the vicinity of the core center. The GI structure is free from crosstalk even with cores with narrow pitches and is thought to be an ideal optical waveguide shape.

Known materials used in few reports on GI optical waveguides include certain norbornene resins and epoxy compounds (Patent Document 2). Light is applied to a coating film of this resin to induce mass diffusion of the photolyte and the photocurable epoxy compound, thereby producing a refractive index gradient.

PRIOR ART DOCUMENTS

Patent Documents

Patent Document 1: Japanese Patent Application Publication No. 2014-510159 (JP 2014-510159 A)
Patent Document 2: Japanese Patent Application Publication No. 2012-198488 (JP 2012-198488 A)
Patent Document 3: International Publication WO2013/002013 Pamphlet

SUMMARY OF THE INVENTION

Problem to be Solved by the Invention

GI optical waveguides described above are difficult to produce. For example, an injection process called the Mosquito method or the like has been proposed, in which a siloxane resin composition is used as a photocurable resin for forming core and cladding, and a photocurable resin serving as a core is drawn as interconnects in a photocurable resin serving as cladding, using a dispenser (Patent Document 3). However, reported examples are few.

On the other hand, in the GI optical waveguides proposed so far, for example, the materials specifically proposed in Patent Document 2 and Patent Document 3 above include hydrocarbon or epoxy group having absorption in the long wavelength band and lead to a problem of high propagation loss in a long wavelength range, which is the recent mainstream. Patent Document 1 merely discloses an SI optical waveguide including the air for a cladding layer and does not discuss an application to GI optical waveguides.

As described above, there has been no report on a production method for a GI optical waveguide having heat resistance to 300° C. or higher, preferably 350° C. or higher and with low propagation loss even in the long wavelength range, and it has been necessary to develop such a production method.

Means for Solving the Problem

The inventors of the present invention have conducted elaborate studies in order to achieve the object above and have found a production method, in which a polymerizable composition including a reactive silicone compound having a certain structure in combination with a di(meth)acrylate compound or an aromatic vinyl compound having a certain structure is used as a cladding material or a core material of an optical waveguide, and a GI optical waveguide having high heat resistance and low light propagation loss in the long wavelength range can be produced with a high degree of flexibility in layout design of cores and through a simple process. This finding has led to completion of the present invention.

As a first aspect, the present invention relates to a production method for an optical waveguide, comprising:
a first step of inserting a needle-like portion at a tip end of an ejection unit into uncured cladding;
a second step of moving the needle-like portion in the uncured cladding while ejecting an uncured material from the needle-like portion to form an uncured core surrounded and covered with the uncured cladding;
a third step of removing the needle-like portion from the uncured cladding; and a fourth step of curing the uncured cladding and the uncured core, in which the uncured cladding is composed of a composition including 100 parts by mass of a reactive silicone compound (a) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 1 part by mass to 200 parts by mass of a di(meth)acrylate compound (b) of Formula [3], and the uncured core is composed of a composition including 100 parts by mass of a reactive silicone compound (x) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 0.1 part by mass to 100 parts by mass of an aromatic vinyl compound (y) of Formula [4]:

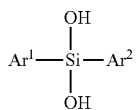

[1]

(wherein $Ar^1$ and $Ar^2$ are independently a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group),

[2]

(wherein $Ar^3$ is a phenyl group having at least one group having a polymerizable double bond, a naphthyl group having at least one group having a polymerizable double bond, or a biphenyl group having at least one group having a polymerizable double bond, $R^1$ is independently methyl group or ethyl group, $R^2$ is methyl group, ethyl group, or vinylphenyl group, and a is 2 or 3),

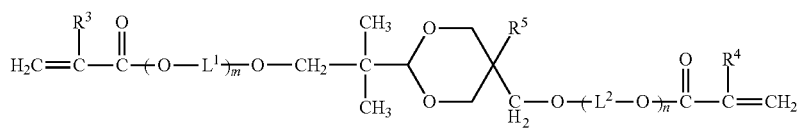

[3]

(wherein $R^3$ and $R^4$ are independently a hydrogen atom or methyl group, $R^5$ is a hydrogen atom, methyl group, or ethyl group, $L^1$ and $L^2$ are independently a $C_{2-6}$ alkylene group, and m and n are 0 or a positive integer, wherein m+n is 0 to 20),

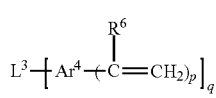

[4]

(wherein $R^6$ is a hydrogen atom or methyl group, $L^3$ is a single bond, a hydrogen atom, an oxygen atom, a $C_{1-20}$ q-valent aliphatic hydrocarbon residue optionally substi- tuted with a phenyl group, or a $C_{1-20}$ q-valent aliphatic hydrocarbon residue optionally including an ether bond, $Ar^4$ is a p+1-valent aromatic hydrocarbon residue, p is independently 1 or 2, and q is an integer of 1 to 3 (wherein q is 1 when $L^3$ is a hydrogen atom, and q is 2 when $L^3$ is a single bond or an oxygen atom)).

As a second aspect, in the production method for an optical waveguide according to the first aspect, between the third step and the fourth step, the first step, the second step, and the third step are repeatedly performed as a sequential process to form a plurality of uncured cores surrounded and covered with the uncured cladding.

Effects of the Invention

The production method for an optical waveguide according to the present invention can produce a GI optical waveguide having excellent optical characteristics such as a high refractive index and low light propagation loss even in the long wavelength region including 1,550 nm, and having high heat resistance against a solder reflowing process required in the production process for opto-electronic circuit boards.

The optical waveguide-forming composition in the present invention can produce a GI optical waveguide, which is said to be difficult to produce, by a simple technique and can produce not only a multimode optical waveguide but also a single-mode GI optical waveguide.

In this way, the present invention enables production of a GI optical waveguide that has high heat resistance and extremely high transparency (low propagation loss) in the long wavelength range and is workable for use on an opto-electronic circuit board.

MODES FOR CARRYING OUT THE INVENTION

<<Production Method for Optical Waveguide>>

A production method for an optical waveguide according to the present invention includes a first step of inserting a needle-like portion at a tip end of an ejection unit into uncured cladding, a second step of moving the needle-like portion in the uncured cladding while ejecting an uncured material from the needle-like portion to form an uncured core surrounded and covered with the uncured cladding, a third step of removing the needle-like portion from the uncured cladding, and a fourth step of curing the uncured cladding and the uncured core.

In the production method in the present invention, between the third step and the fourth step, the first step, the second step, and the third step may be repeatedly performed as a sequential process to form a plurality of uncured cores surrounded and covered with the uncured cladding, and thereafter the fourth step of curing the uncured cladding and the uncured core may be performed.

In the production method for an optical waveguide according to the present invention, as will be described later, the uncured cladding is composed of a composition (which hereinafter may be referred to as a cladding-forming composition) including 100 parts by mass of a reactive silicone compound (a) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 1 part by mass to 200 parts by mass of a di(meth)acrylate compound (b) of Formula [3]. The uncured core is composed of a composition (which hereinafter may be referred to as a core-forming composition) including 100 parts by mass of a reactive silicone compound (x) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 0.1 part by mass to 100 parts by mass of an aromatic vinyl compound (y) of Formula [4].

An example of the actual process for producing an optical waveguide according to the present invention is described in detail.

FIG. 1 to FIG. 5 are diagrams illustrating part of the production process for an optical waveguide. This production process may be referred to as an injection process.

Figure 1:
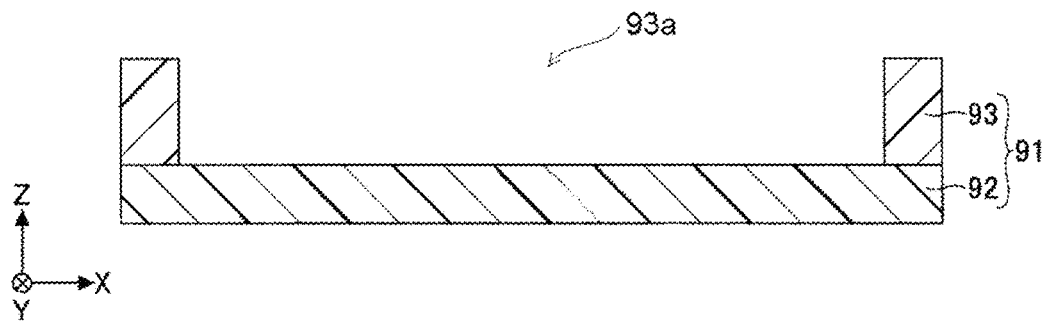
FIG. 1 is a first diagram illustrating a production process for an optical waveguide.

First of all, in the step illustrated in FIG. 1, a support 91 is prepared. The support 91 is a member including a bottom plate 92 having a substantially rectangular shape in a two-dimensional view and an outer frame 93 removably disposed on the periphery of the bottom plate 92. The outer frame 93 has an opening 93a having a substantially frame-like shape in a two-dimensional view. For example, resins (for example, acrylic resins), glass, silicon, ceramics, or metals can be used as the material of the bottom plate 92 and the outer frame 93. It is noted that the bottom plate 92 and the outer frame 93 may not be formed of the same material. It is preferable that the upper surface of the bottom plate 92 has high flatness.

Figure 2:
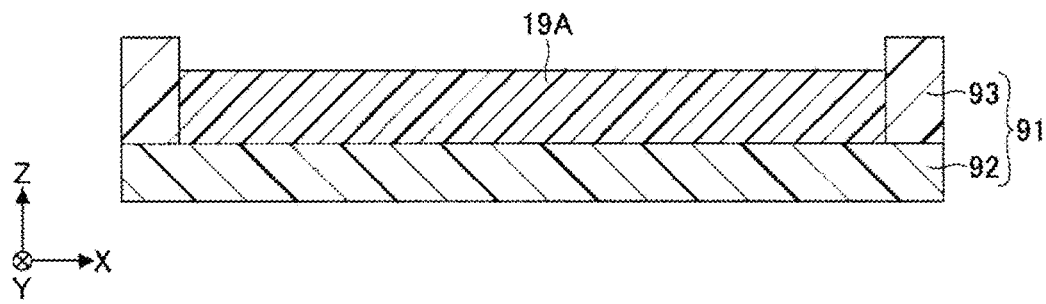
FIG. 2 is a second diagram illustrating a production process for an optical waveguide.

Next, in the step illustrated in FIG. 2, a predetermined material is applied on the upper surface of the bottom plate 92 exposed within the outer frame 93 of the support 91 and uniformly spread to fabricate uncured cladding 19A with a substantially constant layer thickness. The uncured cladding 19A can be fabricated by applying a cladding-forming composition as described later using, for example, an applicator (for example, dispenser) or a printing device or by filling (injecting) the composition from the opening 93a. The material (cladding-forming composition) of the uncured cladding 19A may contain, for example, a raw material that absorbs light, such as carbon black.

The viscosity of the uncured cladding 19A may be, for example, about 3,800 mPa·s. The thickness of the uncured cladding 19A can be determined as desired in accordance with, for example, the diameter of cores 11 to 14 as described later and the production conditions and is preferably about a few mm, and more preferably about 50 μm to 1,000 μm.

Figure 3:
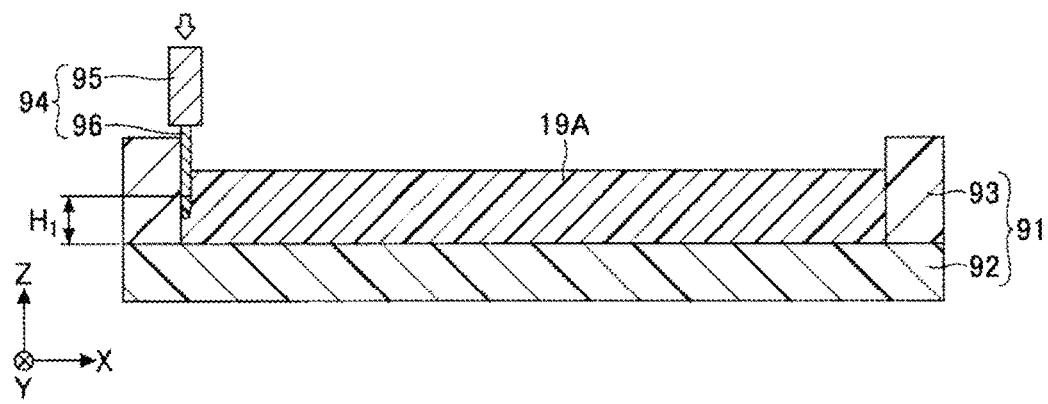
FIG. 3 is a third diagram illustrating a production process for an optical waveguide.

Next, in the step illustrated in FIG. 3, an applicator (not illustrated) having an ejection unit 94 (including an ejection body 95 and a needle-like portion 96) is prepared, and the prepared applicator (not illustrated) is operated to partially insert the needle-like portion 96 at the tip end of the ejection unit 94 into the uncured cladding 19A (first step). The height $H_1$ from the upper surface of the bottom plate 92 of the support 91 to the tip end of the needle-like portion 96 can be selected as appropriate and is set to, for example, about 100 μm to 1,000 μm (when the layer thickness of the uncured cladding 19A is about a few mm).

The applicator (not illustrated) includes a CPU and a memory and has a function programmed to accurately move the ejection unit 94 relative to the uncured cladding 19A in the X direction, the Y direction, and the Z direction at a predetermined moving speed. The needle-like portion 96 is shaped like, for example, a ring in section, and the applicator (not illustrated) has a function of ejecting a predetermined material from the inside of the ring of the needle-like portion 96 at a predetermined ejection pressure. The inner diameter of the ring of the needle-like portion 96 can be selected as appropriate and is set to, for example, about 100 μm to 200 μm. The sectional shape of the needle-like portion 96 may not be a ring and may be a square. The applicator (not illustrated) may include, for example, a tabletop application robot and a dispenser.

Figure 4:
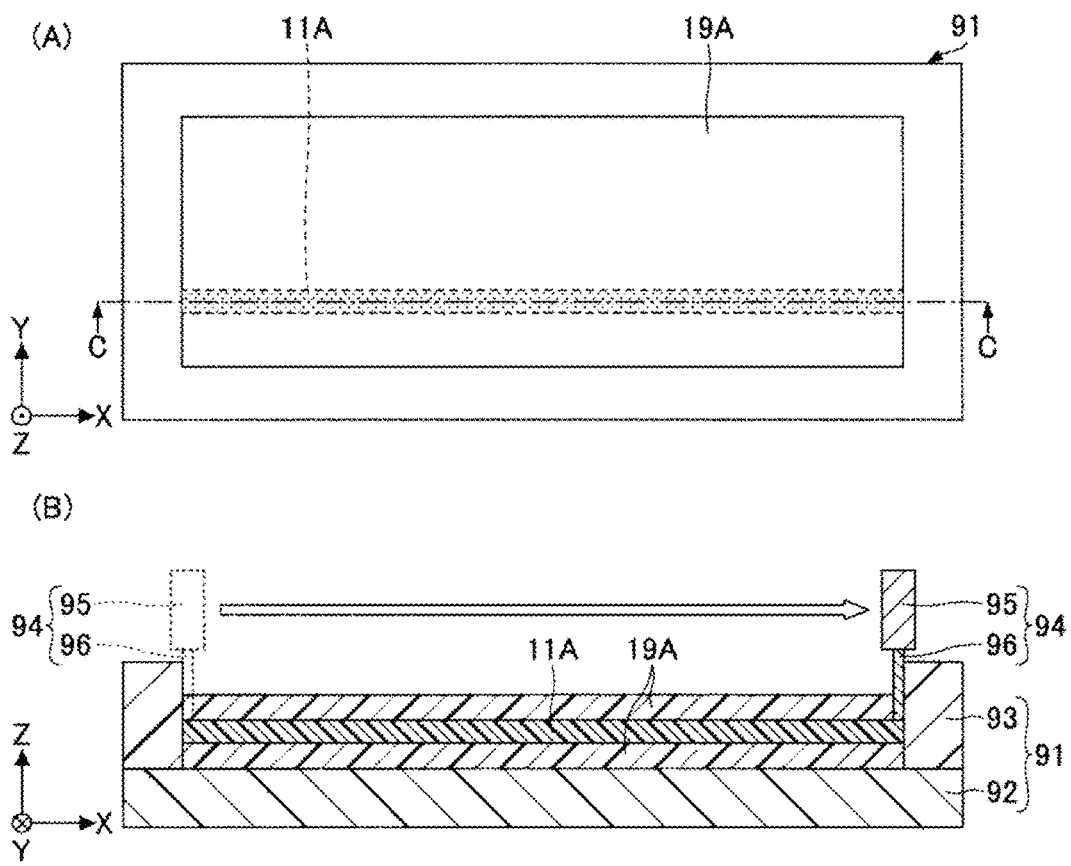
FIG. 4 is a fourth diagram illustrating a production process for an optical waveguide.

Next, in the step illustrated in FIG. 4, the applicator (not illustrated) is operated to move the needle-like portion 96 in the uncured cladding 19A while ejecting a core-forming composition as described later as a material forming an uncured core, from the needle-like portion 96 inserted in the uncured cladding 19A to form an uncured core 11A (second step). In FIG. 4, (A) is a plan view, and (B) is a sectional view taken along line C-C in (A). It is noted that (A) does not illustrate the ejection unit 94. The needle-like portion 96 can be moved in a direction selected appropriately and, here, is moved only in the X direction, by way of example. The moving speed of the needle-like portion 96 can be selected as appropriate and is set to, for example, about 5 mm/s to 30 mm/s. The ejection pressure of the needle-like portion 96 can be selected as appropriate and is set to, for example, about 10 kPa to 1,000 kPa.

The viscosity of the uncured core 11A may be, for example, about 80,800 mPa·s.

The moving speed of the ejection unit 94, the ejection pressure of the needle-like portion 96, and the inner diameter of the ring of the needle-like portion 96 are adjusted in accordance with the properties (for example, viscosity) of the material forming the uncured core 11A (core-forming composition) and the material forming the uncured cladding 19A (cladding-forming composition) to form a core 11, for example, having a circular sectional shape and having a refractive index higher toward the center and lower toward the periphery after curing described later. When the sectional shape of the uncured core 11A is circular, the diameter may be, for example, about 5 μm to 200 μm.

Furthermore, a core 11 having a partially different diameter may be formed by changing the moving speed of the ejection unit 94 and the ejection pressure of the needle-like portion 96 while ejecting the core-forming composition under instructions of a program (spot size conversion).

The uncured core 11A shaped in a circle (sectional shape) having a diameter smaller than the inner diameter of the ring of the needle-like portion 96 can be fabricated by adjusting the moving speed of the ejection unit 94 and the ejection pressure of the needle-like portion 96, depending on the properties (for example, viscosity) of the material (core-forming composition) of the uncured core 11A and the material (cladding-forming composition) of the uncured cladding 19A.

This is achieved as follows. The respective viscosities of the materials are adjusted so that a more viscous material of the uncured core 11A is ejected from the needle-like portion 96. Then, the friction force is increased between the inside surface of the ring of the needle-like portion and the material. As a result, the material is ejected less from the vicinity of the inside surface of the ring, whereas the material is ejected more in the vicinity of the center of the ring where friction with the inside surface of the ring is not produced.

In the step illustrated in FIG. 4 by way of example, the support 91 having the uncured cladding 19A formed therein is fixed, and the needle-like portion 96 is moved in the uncured cladding 19A to form the uncured core 11A. The present invention, however, is not limited to such a manner. For example, the needle-like portion 96 may be fixed while the support 91 having the uncured cladding 19A formed therein may be moved to form the uncured core 11A.

Figure 5:
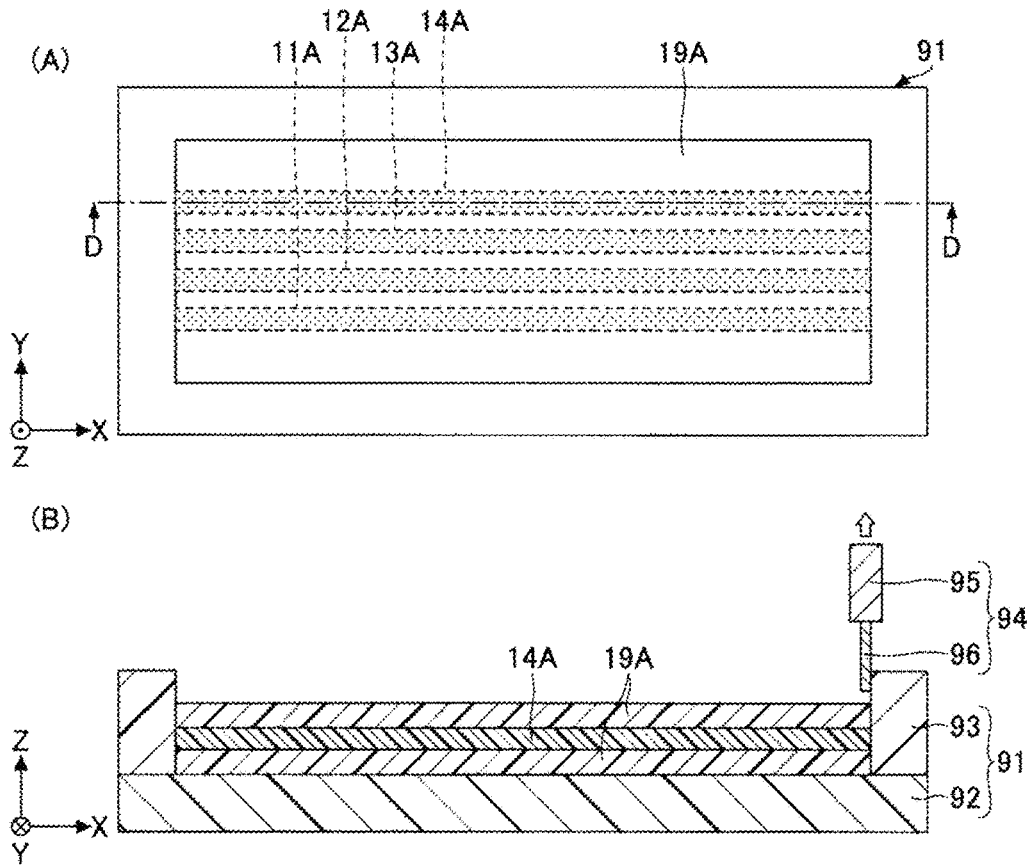
FIG. 5 is a fifth diagram illustrating a production process for an optical waveguide.

Next, in the step illustrated in FIG. 5, the ejection unit 94 is moved in the Z direction from the state illustrated in FIG. 4, and the needle-like portion 96 is removed from the uncured cladding 19A (third step). Subsequently, uncured cores 12A, 13A, and 14A may be formed in parallel with the uncured core 11A by repeating the step in FIG. 3 of inserting the needle-like portion 96 into the uncured cladding 19A, the step in FIG. 4 of forming the uncured core 11A, and the step in FIG. 5 of removing the needle-like portion 96 from the uncured cladding 19A. Although the core-forming composition is used as the material of the uncured cores 12A, 13A, and 14A in the same manner as in the uncured core 11A, any other materials for cores as described later may be used together. The pitch between adjacent cores can be set to, for example, about 20 μm to 300 μm.

As previously mentioned above, the uncured cladding 19A has an adequate flowability (viscosity). Therefore, when the needle-like portion 96 is removed from the uncured cladding 19A, no mark of removal is left, so that after the uncured cores are formed, no interface is formed between the uncured cladding 19A and the uncured cores 11A, 12A, 13A, and 14A. In FIG. 5, (A) is a plan view, and (B) is a sectional view taken along line D-D in (A). It is noted that (A) does not illustrate the ejection unit 94.

After the step illustrated in FIG. 5 (not illustrated), the uncured cores 11A, 12A, 13A, and 14A as well as the uncured cladding 19A are cured by a predetermined method described later, that is, by applying light (for example, ultraviolet rays) or by heating (fourth step). When a material that is not completely cured only with radiation of light is used, heating may be additionally performed after applying light.

In the case of the photocuring, examples of actinic light used for light radiation include ultraviolet rays, electron beams, and X-rays. Examples of the light source used for ultraviolet radiation include sunlight, chemical lamps, low-pressure mercury lamps, high-pressure mercury lamps, metal halide lamps, xenon lamps, and UV-LEDs. After light radiation, post baking is performed, if necessary. Specifically, heating is performed using a hot plate, an oven, or the like, typically at 50° C. to 300° C. for 1 minute to 120 minutes to complete curing (polymerization).

In the case of the thermal curing, the heating conditions may be selected typically from, but not limited to, the ranges of 50° C. to 300° C. and 1 minute to 120 minutes. Examples of the heating means include, but not limited to, a hot plate and an oven.

Through the curing process, the uncured cores 11A, 12A, 13A, and 14A, as well as the uncured cladding 19A are polymerized and cured to form cores 11,12, 13, and 14 as well as cladding 19 (see FIG. 6 to FIG. 8 described later, optical waveguide 10). The cores 11 to 14 are formed continuously and integrally without an interface in the cores 11 to 14, and the cladding 19 is formed integrally without an interface in the cladding 19.

Although the support 91 is prepared in producing an optical waveguide in the present embodiment, the support 91 is not always necessary. For example, the uncured cladding 19A may be fabricated in a concave shape formed in an integrated circuit or a printed circuit board, or a groove or a slit in the board may be fabricated as an alternative to the support.

Although the ejection unit 94 is a single system in the example illustrated in the present embodiment, the present invention is not limited to such an embodiment, and the core-forming composition may be ejected simultaneously from a plurality of ejection units 94 to simultaneously form a plurality of uncured cores (for example 11A to 14A).

An example of the optical waveguide fabricated by the production method as described above is illustrated in FIG. 6 to FIG. 8 (first embodiment).

Figure 6:
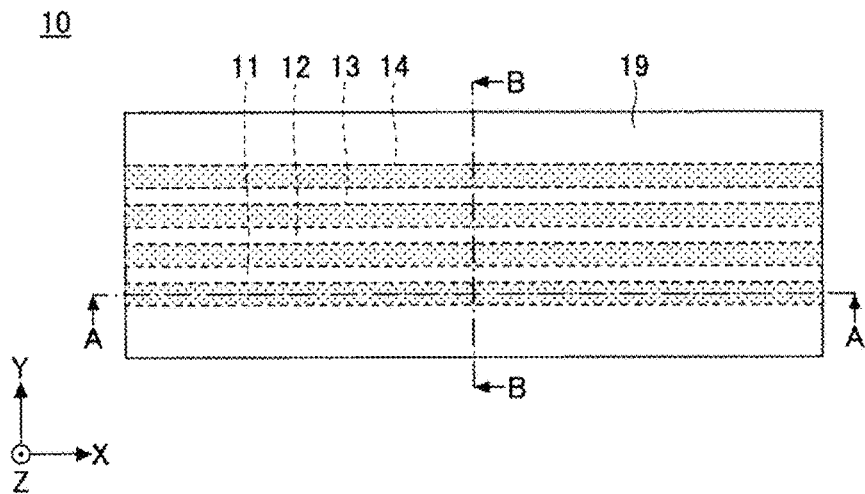
FIG. 6 is a plan view illustrating an optical waveguide (first embodiment) fabricated according to the present invention.

FIG. 6 is a plan view illustrating an optical waveguide 10 in a first embodiment according to the present invention. FIG. 7 is a sectional view taken along line A-A in FIG. 6. FIG. 8 is a sectional view taken along line B-B in FIG. 6.

Figure 7:
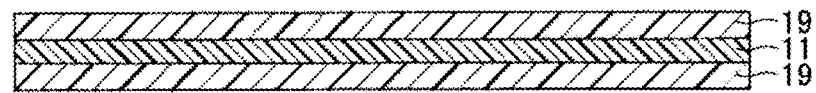
FIG. 7 is a sectional view taken along line A-A in FIG. 6.
Figure 7:
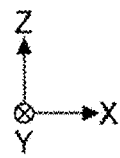
Figure 8:
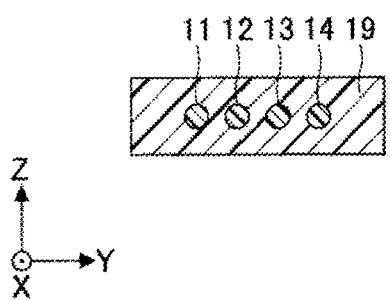
FIG. 8 is a sectional view taken along line B-B in FIG. 6.
Figure 8:
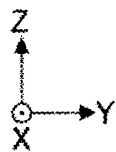

The optical waveguide 10 illustrated in FIG. 6 to FIG. 8 is an optical waveguide having a graded-index (GI)-type refractive index gradient, in which cores 11 to 14 of four channels are juxtaposed in the cladding 19. In FIG. 6 to FIG. 8, the cladding 19 is shaped in a cube or a cuboid, by way of example. The direction parallel to a side of the bottom surface of the cube or the cuboid is the X direction, the direction vertical to the X direction in the bottom surface of the cube or the cuboid is the Y direction, and the direction vertical to the X direction and the Y direction (the height direction of the cube or the cuboid) is the Z direction (the same applies in the subsequent drawings).

In the optical waveguide 10, the cladding 19 is formed of a cured product of the cladding-forming composition, and the cores 11 to 14 are formed of a cured product of the core-forming composition.

The cores 11 to 14 each are a part through which light propagates and are formed of, for example, the core-forming composition, that is, formed of a cured product of the core-forming composition. All of the cores 11 to 14 may be formed of the same material or they may be formed of different materials. For example, a material other than the core-forming composition may be selected as appropriate from materials composed mostly of acrylic resins, epoxy resins, polyimide resins, polyolefin resins, and polynorbornene resins.

As will be described later, the cores 11 to 14 each have a higher refractive index toward the center and have a lower refractive index toward the periphery. The refractive index of the center of each of the cores 11 to 14 may be, for example, about 1.52 to 1.62.

The cores 11 to 14 are each formed continuously and integrally without an interface in the cores 11 to 14. As used herein, the interface refers to the boundary surface formed between two layers when the two layers are in contact with each other (the same applies to the cladding described later). The sectional shape of each of the cores 11 to 14 may be, for example, circular. When the cross-sectional shape of each of the cores 11 to 14 is circular, the diameter of each core is, for example, about 5 μm to 200 μm. In the cores 11 to 14, the pitch between adjacent cores is, for example, about 20 μm to 300 μm. In each of the cores 11 to 14, the height from the bottom surface of the cladding 19 is substantially constant. That is, the cores 11 to 14 are each formed substantially parallel to the XY plane.

In the subject application, the word "circle" means an approximate circle and does not mean a strictly perfect circle. Therefore, the circle may be deviated from a perfect circle without substantially impairing a predetermined effect of the GI optical waveguide.

The cladding 19 is formed to cover the periphery of the cores 11 to 14. In the optical waveguide in the present invention, the cladding 19 is formed of the cladding-forming composition, and more specifically, formed of a cured product of the cladding-forming composition. The cladding-forming composition may contain, for example, a raw material that absorbs light, such as carbon black. The raw material that absorbs light, such as carbon black, is dispersed in the cladding 19 to reduce crosstalk between the adjacent cores. This is particularly advantageous for cores with narrow pitches.

It is noted that the cladding 19 is formed of a material having a refractive index lower than that of the center of the cores 11 to 14. The refractive index of the cladding 19 may be, for example, about 1.51 to 1.60. The sectional shape of the cladding 19 may be, for example, rectangular. The thickness of the cladding 19 may be determined as desired, depending on the diameters of the cores 11 to 14, the production conditions, and the like, and is preferably about a few mm, and more preferably about 50 μm to 1,000 μm. As is clear from the description above of the production process for the optical waveguide 10, the cladding 19 is formed integrally, and there exists no interface in the cladding 19.

Another example of the optical waveguide fabricated by the production method described above is illustrated in FIG. 9 to FIG. 11 (second embodiment).

Figure 9:
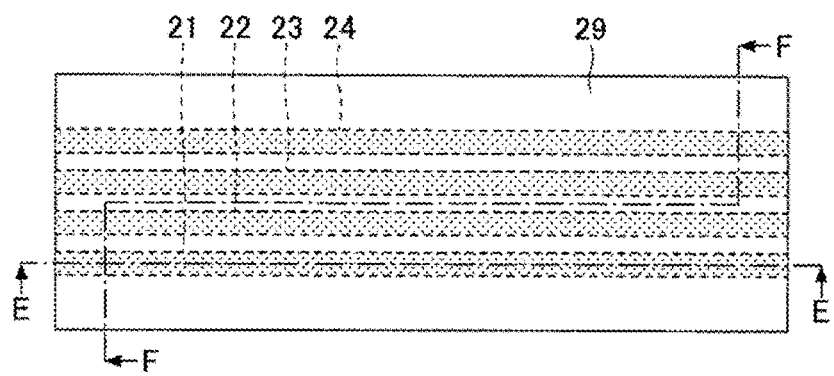
FIG. 9 is a plan view illustrating an optical waveguide in another embodiment (second embodiment) fabricated according to the present invention.
Figure 9:
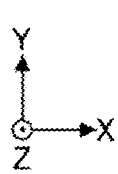
Figure 10:
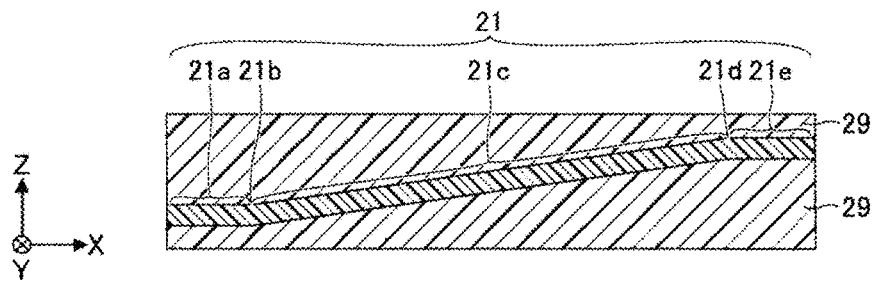
FIG. 10 is a sectional view taken along line E-E in FIG. 9.
Figure 11:
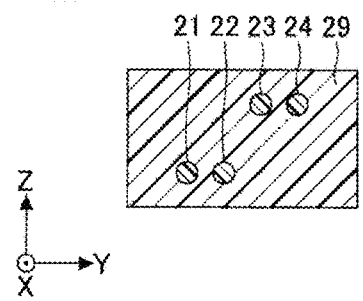
FIG. 11 is a sectional view taken along line F-F in FIG. 9.

In this example, a slope-type optical waveguide with cores partially inclined is illustrated. FIG. 9 is a plan view illustrating an optical waveguide 20 according to a second embodiment. FIG. 10 is a sectional view taken along line E-E in FIG. 9. FIG. 11 is a sectional view taken along line F-F in FIG. 9.

In FIG. 9 to FIG. 11, the optical waveguide 20 is a GI optical waveguide in which cores 21 to 24 of four channels are juxtaposed in cladding 29. The materials, the sectional shapes, functions, and the like of the cores 21 to 24 and the cladding 29 are similar to those of the cores 11 to 14 and the cladding 19 in the foregoing first embodiment and will not be further elaborated.

In the optical waveguide 10, the entire cores 11 to 14 are each formed linearly in one direction (a direction substantially parallel to the X direction). In the optical waveguide 20, the cores 21 to 24 are each formed to include an inclined portion (slope portion). That is, the cores 21 to 24 each include a bending portion and are not formed linearly in one direction. The bending portion may be curved (may be bent like a bow).

More specifically, the core 21 of the optical waveguide 20 includes a portion 21a formed linearly in a direction substantially parallel to the X direction, a bending portion 21b, a portion 21c (slope portion) formed linearly in a direction inclined in the Z direction relative to the X direction, a bending portion 21d, and a portion 21e formed linearly in a direction substantially parallel to the X direction.

The portions 21a, 21c, and 21e lie on straight lines different from each other. The portion 21a and the portion 21e are on different levels with different distances from the bottom surface of the cladding 29. It is noted that these portions are obtained by dividing the core 21 into a plurality of portions for the sake of convenience, and the core 21 is formed continuously and integrally without an interface in the core 21. The cores 22 to 24 have a shape similar to the shape of the core 21.

To produce a slope-type optical waveguide, for example, in the step illustrated in FIG. 4 (second step), the applicator (not illustrated) may be programmed such that the needle-like portion 96 moves while changing the vertical distance from the bottom surface of the uncured cladding. That is, the slope portion (portion 21c) can be formed by programming the applicator (not illustrated) such that the needle-like portion 96 moves in the X direction and also moves in the Z direction. The moving speed in the X direction and the moving speed in the Z direction can be set as appropriate, considering the inclined angle of the slope portion (portion 21c) as intended.

A core including a portion inclined in the Y direction relative to the XZ plane may be formed by moving the needle-like portion 96 while changing the horizontal distance from the side surface of the uncured cladding. Furthermore, a core including a portion inclined in the Z direction relative to the XY plane and inclined in the Y direction relative to the XZ plane may be formed by moving the needle-like portion 96 while changing the vertical distance from the bottom surface of the uncured cladding and changing the horizontal distance from the side surface. In short, cores of various shapes can be formed in a simple process by controlling the applicator (not illustrated) such that the needle-like portion 96 ejects a predetermined material while the needle-like portion 96 moves in a desired direction.

In the second embodiment, the example in which the portions 21a, 21c, and 21e are formed linearly has been illustrated. Alternatively, the portions 21a, 21c, and 21e may be formed in a curved shape (including a coil shape, a spiral shape, and a helix shape. The same shall apply hereinafter). Even when the portions 21a, 21c, and 21e are curved, light propagates in the same manner as when they are linear. Alternatively, both the linear portion and the curved portion may be present. For example, the portion 21a is formed linearly, and the portions 21c and 21e may be formed in a curved shape. The portions 21a, 21c, and 21e may lie on the same plane or may lie on planes different from each other.

In this way, the second embodiment achieves similar effects as in the first embodiment. More specifically, a slope-type optical waveguide is formed, which includes a core parallel to a predetermined surface of the cladding and/or a core inclined relative to a predetermined surface of the cladding in single cladding formed integrally without an interface.

Another example of the optical waveguide fabricated by the production method described above is further illustrated in FIG. 12 to FIG. 14 (third embodiment).

Figure 12:
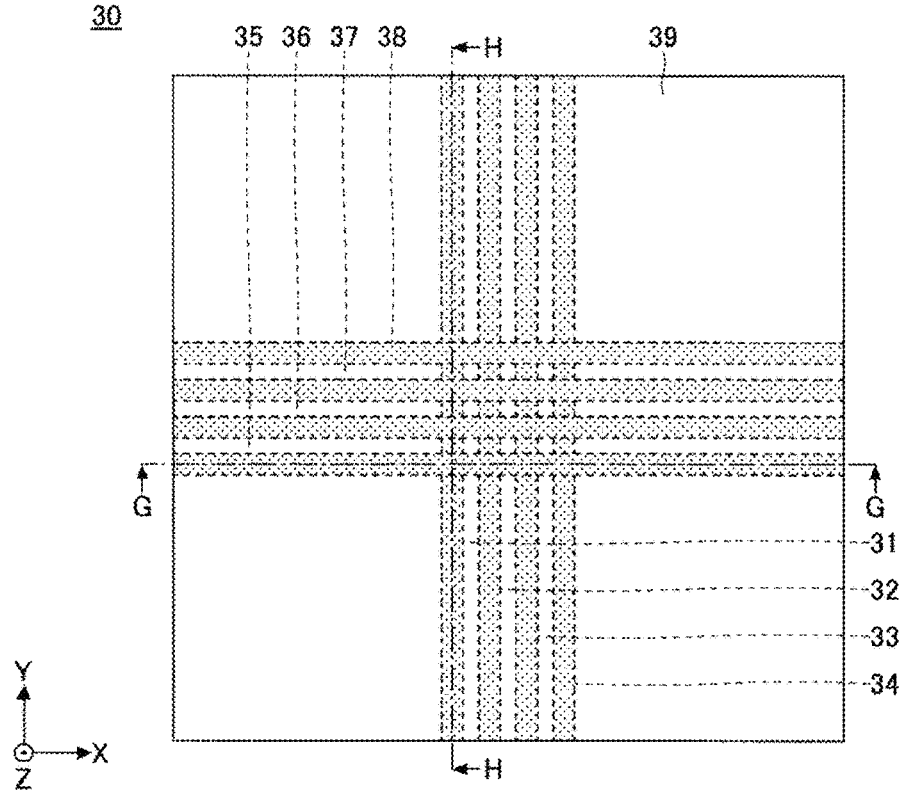
FIG. 12 is a plan view illustrating an optical waveguide in another embodiment (third embodiment) fabricated according to the present invention.
Figure 13:
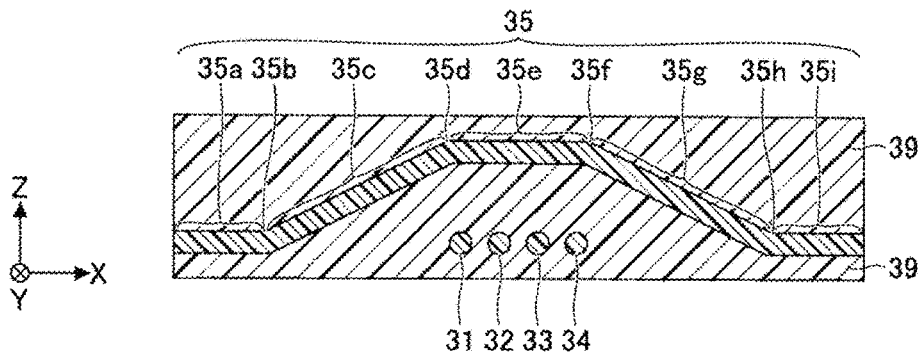
FIG. 13 is a sectional view taken along line G-G in FIG. 12.
Figure 14:
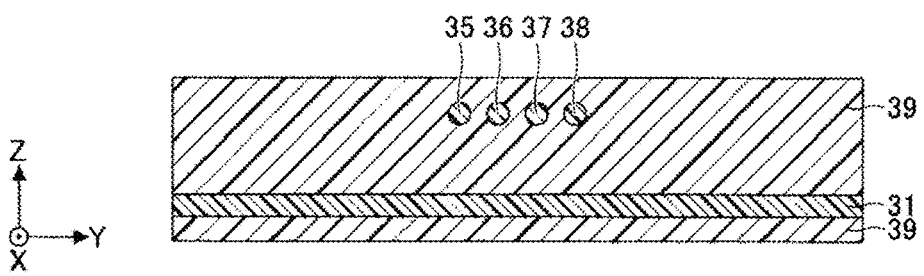
FIG. 14 is a sectional view taken along line H-H in FIG. 12.

The present example illustrates a three-dimensional intersection-type optical waveguide in which cores three-dimensionally intersect with each other. FIG. 12 is a plan view illustrating an optical waveguide according to a third embodiment. FIG. 13 is a sectional view taken along line G-G in FIG. 12. FIG. 14 is a sectional view taken along line H-H in FIG. 12.

In FIG. 12 to FIG. 14, an optical waveguide 30 is a GI optical waveguide including cores 31 to 38 of eight channels formed in cladding 39. The materials, sectional shapes, functions, and the like of the cores 31 to 38 and the cladding 39 are similar to those of the cores 11 to 14 and the cladding 19 in the foregoing first embodiment and will not be further elaborated.

In the optical waveguide 30, the entire cores 31 to 34 are each formed linearly in one direction (a direction substantially parallel to the Y direction). On the other hand, the cores 35 to 38 are each formed to include an inclined portion (slope portion). That is, the cores 35 to 38 each include a bending portion and are not formed linearly in one direction. The bending portion may be curved (may be bent like a bow).

More specifically, the core 35 of the optical waveguide 30 includes a portion 35a formed linearly in a direction substantially parallel to the X direction, a bending portion 35b, a portion 35c (slope portion) formed linearly in a direction inclined (rising) in the Z direction relative to the X direction, a bending portion 35d, a portion 35e formed linearly in a direction substantially parallel to the X direction, a bending portion 35f, a portion 35g (slope portion) formed linearly in a direction inclined (declining) in the Z direction relative to the X direction, a bending portion 35h, and a portion 35i formed linearly in a direction substantially parallel to the X direction.

The portions 35a, 35c, 35e, and 35g lie on straight lines different from each other, whereas the portions 35a and 35i lie on the same straight line. However, the portions 35a and 35i may not necessarily be formed on the same straight line. The portions 35a and 35i and the portion 35e are on different levels with different distances from the bottom surface of the cladding 39. It is noted that these portions are obtained by dividing the core 35 into a plurality of portions for the sake of convenience, and the core 35 is formed continuously and integrally without an interface in the core 35. The cores 36 to 38 have a shape similar to the shape of the core 35. The cores 35 to 38 three-dimensionally intersect with the cores 31 to 34.

To produce the three-dimensional intersection-type optical waveguide, for example, the production method in the first embodiment and the production method in the second embodiment may be combined. It should be noted that the cores 31 to 34 should be fabricated first, and that the cores 35 to 38 should be thereafter fabricated. In the same manner as in the second embodiment, cores of various shapes can be formed in a simple process by controlling the applicator (not illustrated) such that the needle-like portion 96 ejects a predetermined material while the needle-like portion 96 moves in a desired direction. In the same manner as in the second embodiment, the portions 35a, 35c, 35e, 35g, and 35i may be formed in a curved shape, or both a linear portion and a curved portion may be present. The portions 35a, 35c, 35e, 35g, and 35i may lie on the same plane or may lie on planes different from each other.

In this way, in the third embodiment, a three-dimensional intersection-type optical waveguide is formed, in which the cores three-dimensionally intersect with each other in single cladding formed integrally without an interface as in the first embodiment.

<Cladding-Forming Composition>

The cladding-forming composition is a composition including 100 parts by mass of a reactive silicone compound (a) composed of a polycondensate of a diarylsilicic acid compound A of Formula [1] with an alkoxy silicon compound B of Formula [2], or a polycondensate of the diarylsilicic acid compound A and the alkoxy silicon compound B with another polycondensable compound, and 1 part by mass to 200 parts by mass of a di(meth)acrylate compound (b) of Formula [3].

More preferably, 1 part by mass to 100 parts by mass of the component (b) is blended with respect to 100 parts of the component (a).

<(a) Reactive Silicone Compound>

The reactive silicone compound (a) included in the cladding-forming composition is a polycondensate of the diarylsilicic acid compound A having a certain structure with the alkoxy silicon compound B having a certain structure, or a polycondensate of the diarylsilicic acid compound A and the alkoxy silicon compound B with another polycondensable compound. The polycondensate is obtained by polycondensation of the compound A with the compound B and, if desired, another polymerizable compound in the presence of an acid or a base.

<Polycondensable Compound>
[Diarylsilicic Acid Compound A]

The diarylsilicic acid compound A is a compound of Formula [1] below.

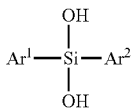

[1]

In Formula [1] above, $Ar^1$ and $Ar^2$ are independently a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group.

Examples of the phenyl group optionally substituted with a $C_{1-6}$ alkyl group, represented by $Ar^1$ and $Ar^2$, include phenyl group, o-tolyl group, m-tolyl group, p-tolyl group, 4-ethylphenyl group, 4-isopropylphenyl group, 4-tert-butylphenyl group, 3,5-dimethylphenyl group, 3,5-diethylphenyl group, 3,5-diisopropylphenyl group, and 2,4,6-trimethylphenyl group.

Examples of the naphthyl group optionally substituted with a $C_{1-6}$ alkyl group, represented by $Ar^1$ and $Ar^2$, include 1-naphthyl group, 2-naphthyl group, 4-methylnaphthalen-1-yl group, and 6-methylnaphthalen-2-yl group.

Examples of the biphenyl group optionally substituted with a $C_{1-6}$ alkyl group, represented by $Ar^1$ and $Ar^2$, include [1,1'-biphenyl]-2-yl group, [1,1'-biphenyl]-3-yl group, and [1,1'-biphenyl]-4-yl group.

Specific examples of the compound of Formula [1] above include, but not limited to, diphenylsilanediol, di-p-tolylsilanediol, bis(4-ethylphenyl)silanediol, bis(4-isopropylphenyl)silanediol, dinaphthylsilanediol, and bis([1,1'-biphenyl]-4-yl)silanediol.

[Alkoxy Silicon Compound B]

The alkoxy silicon compound B is a compound of Formula [2] below.

$$Ar^3-Si(OR^1)_aR^2_{3-a}$$ [2]

In Formula [2] above, $Ar^3$ is a phenyl group having at least one group having a polymerizable double bond, a naphthyl group having at least one group having a polymerizable double bond, a naphthyl group having at least one group having a polymerizable double bond, or a biphenyl group having at least one group having a polymerizable double bond, $R^1$ is independently methyl group or ethyl group, $R^2$ is methyl group, ethyl group, or vinylphenyl group, and a is 2 or 3.

Examples of the phenyl group having at least one group having a polymerizable double bond, represented by $Ar^3$, include 2-vinylphenyl group, 3-vinylphenyl group, 4-vinylphenyl group, 4-vinyloxyphenyl group, 4-allylphenyl group, 4-allyloxyphenyl group, and 4-isopropenylphenyl group.

Examples of the naphthyl group having at least one group having a polymerizable double bond, represented by $Ar^3$, include 4-vinylnaphthalen-1-yl group, 5-vinylnaphthalen-1-yl group, 6-vinylnaphthalen-2-yl group, 4-allylnaphthalen-1-yl group, 5-allylnaphthalen-1-yl group, 6-allylnaphthalen-2-yl group, 4-allyloxynaphthalen-1-yl group, 5-allyloxynaphthalen-1-yl group, 8-allyloxynaphthalen-1-yl group, 5-vinyloxynaphthalen-1-yl group, and 5-isopropenylnaphthalen-1-yl group.

Examples of the biphenyl group having at least one group having a polymerizable double bond, represented by $Ar^3$, include 4'-vinyl-[1,1'-biphenyl]-2-yl group, 4'-vinyl-[1,1'-biphenyl]-3-yl group, 4'-vinyl-[1,1'-biphenyl]-4-yl group, 4'-vinyloxy-[1,1'-biphenyl]-4-yl group, 4'-allyl-[1,1'-biphenyl]-4-yl group, 4'-allyloxy-[1,1'-biphenyl]-4-yl group, and 4'-isopropenyl-[1,1'-biphenyl]-4-yl group.

Specific examples of the compound of Formula [2] include, but not limited to, trimethoxy(4-vinylphenyl)silane, triethoxy(4-vinylphenyl)silane, (4-isopropenylphenyl)trimethoxysilane, dimethoxy(methyl)(4-vinylphenyl)silane, dimethoxybis(4-vinylphenyl)silane, trimethoxy(4-vinyl-1-naphthyl)silane, trimethoxy(5-vinyl-1-naphthyl)silane, trimethoxy(6-vinyl-2-naphthyl)silane, and trimethoxy(4'-vinyl-[1,1'-biphenyl]-4-yl)silane.

[Another Polycondensable Compound]

The reactive silicone compound (a) included in the cladding-forming composition may include another polycondensable compound, in addition to the diarylsilicic acid compound A and the alkoxy silicon compound B.

Another polycondensable compound may be any compound that is polymerizable with the compound A and the compound B, such as hydrolytic silane compounds, other than the compound A and the compound B.

Examples of another polycondensable compound include tetramethoxysilane, tetraethoxysilane, trimethoxy(methyl)silane, trimethoxy(vinyl)silane, 3-(meth)acryloyloxypropyl(trimethoxy)silane, trimethoxy(phenyl)silane, trimethoxy(1-naphthyl)silane, dimethoxy(dimethyl)silane, dimethoxy(diphenyl)silane, dimethoxy(methyl)(vinyl)silane, 3-(meth)acryloyloxypropyl(dimethoxy)(methyl)silane, and dimethoxy(methyl)(phenyl)silane.

Preferable Examples of Reactive Silicone Compound

It is preferable that the reactive silicone compound (a) is composed of a polycondensate of the diarylsilicic acid compound A with the alkoxy silicon compound B (a polycondensate not including another polymerizable compound). In particular, a polycondensate of diphenylsilanediol as the diarylsilicic acid compound A with a compound of Formula [2a] below as the alkoxy silicon compound B is preferred.

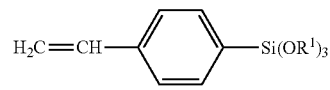

[2a]

In Formula [2a] above, $R^1$ is the same as defined above.

[Blending Ratio of Diarylsilicic Acid Compound A and Alkoxy Silicon Compound B]

The blending molar ratio in a polycondensation reaction of the diarylsilicic acid compound A of Formula [1] and the alkoxy silicon compound B of Formula [2] for use in the reactive silicone compound is not limited to a particular value, but preferably, for the purpose of preventing block-copolymerization, the diarylsilicic acid compound A:alkoxy silicon compound B is in a range of 2:1 to 1:2. More preferably, the blending ratio is in a range of 1.1:0.9 to 0.9:1.1.

When another polycondensable compound is contained as a polycondensable compound, in addition to the compound A and the compound B, the blending ratio is not limited to a particular value, but, in general, another polycondensable compound is blended preferably in 50 mol % or less with respect to the alkoxy silicon compound B.

Compounds can be appropriately selected as necessary and used as the diarylsilicic acid compound A and the alkoxy silicon compound B, and different kinds of compounds may be used in combination. Also in this case, the molar ratio of the total amount of the diarylsilicic acid compound A and the total amount of the alkoxy silicon compound B falls within the range above.

[Acid or Basic Catalyst]

A polycondensation reaction of the diarylsilicic acid compound A of Formula [1] with the alkoxy silicon compound B of Formula [2] (and, if desired, another polycondensable compound) is preferably performed in the presence of an acid or basic catalyst.

The catalyst for use in the polycondensation reaction may be appropriately selected as necessary and used out of any kind as long as it is dissolved or uniformly dispersed in a solvent described later.

Examples of the catalyst that can be used include acid compounds, such as $B(OR)_3$, $Al(OR)_3$, $Ti(OR)_4$, and $Zr(OR)_4$; and basic compounds, such as alkali metal hydroxides, alkaline-earth metal hydroxides, ammonium salts, and amines; and fluoride salts, such as $NH_4F$ and $NR_4F$. Here, R is at least one group selected from the group consisting of a hydrogen atom, a linear alkyl group having a carbon atom number of 1 to 12, a branched alkyl group having a carbon atom number of 3 to 12, and a cyclic alkyl group having a carbon atom number of 3 to 12.

Examples of the acid compounds include boric acid, trimethoxyboron, triethoxyboron, tri-n-propoxyboron, tri-isopropoxyboron, tri-n-butoxyboron, triisobutoxyboron, tri-sec-butoxyboron, tri-tert-butoxyboron, trimethoxyaluminum, triethoxyaluminum, tri-n-propoxyaluminum, triisopropoxyaluminum, tri-n-butoxyaluminum, triisobutoxyaluminum, tri-sec-butoxyaluminum, tri-tert-butoxyaluminum, tetramethoxytitanium, tetraethoxytitanium, tetra-n-propoxytitanium, tetraisopropoxytitanium (titanium tetraisopropoxide), tetra-n-butoxytitanium, tetraisobutoxytitanium, tetra-sec-butoxytitanium, tetra-tert-butoxytitanium, tetramethoxyzirconium, tetraethoxyzirconium, tetra-n-propoxyzirconium, tetraisopropoxyzirconium, tetra-n-butoxyzirconium, tetraisobutoxyzirconium, tetra-sec-butoxyzirconium, and tetra-tert-butoxyzirconium.

Examples of the basic compounds include sodium hydroxide, potassium hydroxide, magnesium hydroxide, calcium hydroxide, strontium hydroxide, barium hydroxide, ammonium hydroxide, tetramethylammonium hydroxide, tetrabutylammonium hydroxide, and triethylamine.

Examples of the fluoride salts include ammonium fluoride, tetramethylammonium fluoride, and tetrabutylammonium fluoride.

Among these catalysts, preferably used are one or more selected from the group consisting of tetraisopropoxytitanium (titanium tetraisopropoxide), magnesium hydroxide, calcium hydroxide, strontium hydroxide, and barium hydroxide.

The amount of the catalyst used is 0.01% by mass to 10% by mass, and preferably 0.1% by mass to 5% by mass with respect to the total mass of the diarylsilicic acid compound and the alkoxy silicon compound. When the amount of the catalyst used is 0.01% by mass or more, the reaction proceeds better. Considering cost efficiency, the use in the amount of 10% by mass or less is sufficient.

[Polycondensation Reaction]

One feature of the reactive silicone compound is the structure of the alkoxy silicon compound. The reactive group (polymerizable double bond) included in the alkoxy silicon compound used in the present invention is easily polymerized radically and ionically (anionically, cationically) and exhibits high heat resistance after polymerization (after curing).

When such an alkoxy silicon compound and the diarylsilicic acid compound are polycondensed into a silicone compound with high heat resistance, it is necessary to terminate the reaction at an adequate degree of polymerization in order to keep the product in a liquid state. The alkoxy silicon compound used in the present invention does not actively hydrolyze and therefore is characterized in that a polycondensation reaction with the diarylsilicic acid compound is moderate and that the degree of polymerization is easily controlled.

A polycondensation reaction of the alkoxy silicon compound and the diarylsilicic acid compound by dealcoholation can be performed in the absence of a solvent but can be performed using a solvent that is inert against the alkoxy silicon compound, such as toluene, as described later, as a reaction solvent. The absence of a solvent is advantageous in that alcohol that is a reaction by-product is easily distilled off. On the other hand, the use of a reaction solvent is advantageous in that the reaction system is easily homogenized, and that a polycondensation reaction proceeds more stably.

The synthesis reaction of the reactive silicone compound may be performed in the absence of a solvent as previously mentioned, or a solvent may be used in order to homogenize the reaction system more. Any solvent may be used as long as it does not react with the diarylsilicic acid compound or the alkoxy silicon compound and dissolves the condensate thereof.

Examples of such a reaction solvent include ketones, such as acetone and methyl ethyl ketone (MEK); ethers, such as tetrahydrofuran (THF) and 1,4-dioxane; aromatic hydrocarbons, such as benzene, toluene, and xylene; glycols, such as ethylene glycol, propylene glycol, and hexylene glycol; glycol ethers, such as ethyl cellosolve, butyl cellosolve, ethyl carbitol, butyl carbitol, diethyl cellosolve, and diethyl carbitol; and amides, such as N-methyl-2-pyrrolidone (NMP) and N,N-dimethylformamide (DMF). These solvents may be used singly or in combination of two or more. Among them, toluene is preferred.

The reactive silicone compound (a) contained in the cladding-forming composition is obtained by performing dealcoholation condensation of the diarylsilicic acid compound A of Formula [1] and the alkoxy silicon compound B of Formula [2] (and, if desired, another polycondensable compound) in the presence of an acid or basic catalyst. It is desirable that the reaction is performed in an inert gas atmosphere, such as nitrogen gas, in order to prevent mixing of moisture. The reaction temperature is 20° C. to 150° C., and more preferably 30° C. to 120° C.

The reaction time is not limited as long as it is equal to or longer than the time required for termination of molecular weight increase of the polycondensate and for stabilization of the molecular weight distribution. More specifically, the reaction time is a few hours to a few days.

After the polycondensation reaction is finished, the resulting reactive silicone compound is collected by any methods, such as filtration and solvent distillation, and, if necessary, a purification process is performed as appropriate.

In the reactive silicone compound composed of the polycondensate obtained through such a reaction, the weight average molecular weight Mw measured by gel permeation chromatography (GPC) in terms of polystyrene is 500 to 10,000, and the degree of distribution Mw (weight average molecular weight)/Mn (number average molecular weight) is 1.0 to 10.

<Di(Meth)Acrylate Compound (b)>

The di(meth)acrylate compound (b) included in the cladding-forming composition is a dioxane compound of Formula [3] below. In this description, (meth)acrylate refers to both acrylate and methacrylate.

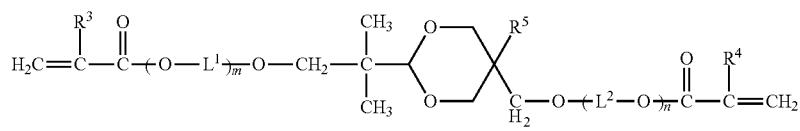

[3]

In Formula [3] above, $R^3$ and $R^4$ are independently a hydrogen atom or methyl group, $R^5$ is a hydrogen atom, methyl group, or ethyl group, $L^1$ and $L^2$ are independently a $C_{2-6}$ alkylene group, and m and n are 0 or a positive integer, wherein m+n is 0 to 20.

Examples of the $C_{2-6}$ alkylene group represented by $L^1$ and $L^2$ include ethylene group, trimethylene group, methylethylene group, tetramethylene group, 1-methyltrimethylene group, 2-methyltrimethylene group, 1,1-dimethylethylene group, pentamethylene group, 1-methyltetramethylene group, 2-methyltetramethylene group, 1,1-dimethyltrimethylene group, 1,2-dimethyltrimethylene group, 2,2-dimethyltrimethylene group, 1-ethyltrimethylene group, hexamethylene group, 1-methylpentamethylene group, 2-methylpentamethylene group, 3-methylpentamethylene group, 1,1-dimethyltetramethylene group, 1,2-dimethyltetramethylene group, 2,2-dimethyltetramethylene group, 1-ethyltetramethylene group, 1,1,2-trimethyltrimethylene group, 1,2,2-trimethyltrimethylene group, 1-ethyl-1-methyltrimethylene group, and 1-ethyl-2-methyltrimethylene group.

In the compound of Formula [3], m and n are such that preferably m+n is 0 to 10, and that more preferably m+n is 0 to 5.

Specific examples of the compound of Formula [3] include, but not limited to, 2-(5-hydroxymethyl-1,3-dioxan-2-yl)-2-methylpropan-1-ol di(meth)acrylate, 2-(5-methyl-5-hydroxymethyl-1,3-dioxan-2-yl)-2-methylpropan-1-ol di(meth)acrylate, 2-(5-ethyl-5-hydroxymethyl-1,3-dioxan-2-yl)-2-methylpropan-1-ol di(meth)acrylate, ethylene oxide-modified 2-(5-ethyl-5-hydroxymethyl-1,3-dioxan-2-yl)-2-methylpropan-1-ol di(meth)acrylate, and propylene oxide-modified 2-(5-ethyl-5-hydroxymethyl-1,3-dioxan-2-yl)-2-methylpropan-1-ol di(meth)acrylate.

Among commercially available products, for example, NK Ester A-DOG [manufactured by Shin-Nakamura Chemical CO., Ltd] can be suitably used.

The di(meth)acrylate compound (b) included in the cladding-forming composition may contain at least one selected from the group consisting of the dioxane compounds above singly, or in combination of two or more.

The optical waveguide-forming composition in the present invention may include an aromatic vinyl compound (y) described later.

<Core-Forming Composition>

The core-forming composition is a composition including 100 parts by mass of a reactive silicone compound (x) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 0.1 part by mass to 100 parts by mass of an aromatic vinyl compound (y) of Formula [4].

More preferably, 0.1 part by mass to 25 parts by mass of the component (y) is blended with respect to 100 parts of the component (x).

<Reactive Silicone Compound (x)>

The <reactive silicone compound (a)> in the cladding-forming composition described above can be used as the component (x) included in the core-forming composition. In the component (a) and the component (x), the same compound or different compounds may be used.

<Aromatic Vinyl Compound (y)>

The aromatic vinyl compound (y) is a compound of Formula [4].

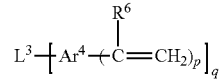

[4]

In Formula [4], $R^6$ is a hydrogen atom or methyl group, $L^3$ is a single bond, a hydrogen atom, an oxygen atom, a $C_{1-20}$ q-valent aliphatic hydrocarbon residue optionally substituted with a phenyl group, or a $C_{1-20}$ q-valent aliphatic hydrocarbon residue optionally including an ether bond, $Ar^4$ is a p+1-valent aromatic hydrocarbon residue, p is independently 1 or 2, and q is an integer of 1 to 3 (wherein q is 1 when $L^3$ is a hydrogen atom, and q is 2 when $L^3$ is a single bond or an oxygen atom).

Examples of a $C_{1-20}$ q-valent aliphatic hydrocarbon in the $C_{1-20}$ q-valent aliphatic hydrocarbon residue optionally substituted with a phenyl group or the $C_{1-20}$ q-valent aliphatic hydrocarbon residue optionally including an ether bond, represented by $L^3$, include linear alkanes, such as methane, ethane, propane, n-butane, n-pentane, n-hexane, n-heptane, n-octane, n-nonane, n-decane, n-undecane, n-dodecane, n-tridecane, n-tetradecane, n-pentadecane, n-hexadecane, n-heptadecane, n-octadecane, n-nonadecane, and n-eicosane; branched alkanes, such as 2-methylpropane and 2,2-dimethylpropane; and cyclic alkanes, such as cyclopentane and cyclohexane. Examples of the $C_{1-20}$ q-valent aliphatic hydrocarbon residue include an alkyl group, an alkanediyl group, and an alkanetriyl group obtained by removing 1 to 3 hydrogen atoms from the alkanes above.

Examples of such $L^3$ include methyl group, ethyl group, n-propyl group, isopropyl group, n-butyl group, n-hexyl group, cyclohexyl group, benzyl group, phenethyl group, methoxymethyl group, ethoxymethyl group, 2-methoxyethyl group, methylene group, ethylene group, trimethylene group, 1-methylethylene group, propane-2,2-diyl group, tetramethylene group, pentamethylene group, 2,2-dimethyltrimethylene group, hexamethylene group, 3-methylpentamethylene group, cyclohexane-1,4-diyl group, diethylene glycol residue (—CH$_2$CH$_2$OCH$_2$CH$_2$—), triethylene glycol residue (—(CH$_2$CH$_2$O)$_2$CH$_2$CH$_2$—), dipropylene glycol residue (—CH(CH$_3$)CH$_2$OCH(CH$_3$)CH$_2$—), oxytetramethyleneoxy group, propane-1,1,1-triyl group, propane-1,1,3-triyl group, butane-1,2,4-triyl group, and cyclohexane-1,3,5-triyl group.

Examples of the p+1-valent aromatic hydrocarbon residue, represented by Ar$^4$, include groups obtained by removing p+1 hydrogen atoms from an aromatic hydrocarbon ring, such as benzene and naphthalene.

Among the compounds of Formula [4], a compound in which L$^3$ is a hydrogen atom, q is 1, and p is 2 is preferred.

Specific examples of the compound of Formula [4] include styrene, 1-phenethyl-4-vinylbenzene, 1-vinylnaphthalene, 2-vinylnaphthalene, divinylbenzene, diisopropylenebenzene, divinylnaphthalene, 4,4'-divinylbiphenyl, bis(4-vinylphenyl) ether, 1-vinyl-2-(4-vinylphenoxy)benzene, 2,2-bis(4-vinylphenyl)propane, and 1,1,1-tris(4-vinylphenoxy) propane.

Among them, styrene, 1-vinylnaphthalene, divinylbenzene, and 2,2-bis(4-vinylphenyl)propane are preferred, and divinylbenzene is more preferred.

In the core-forming composition used in the present invention, the aromatic vinyl compound (y) may be used singly, or two or more may be used in combination.

<Polymerization Initiator>

The cladding-forming composition can yield a cured product by allowing the polymerizable double bonds included in the reactive silicone compound (a) and the di(meth)acrylate compound (b) to react in the presence of a polymerization initiator by light radiation or heating.

Similarly, the core-forming composition can yield a cured product by allowing the polymerizable double bonds included in the reactive silicone compound (x) and the polymerizable double bonds included in the aromatic vinyl compound (y) to react in the presence of a polymerization initiator by light radiation or heating.

Either of a thermal polymerization initiator or a photopolymerization initiator can be used as the polymerization initiator.

Examples of the thermal polymerization initiator include azos and organic peroxides.

Examples of commercially available azo thermal polymerization initiators include V-30, V-40, V-59, V-60, V-65, and V-70 [all of which are manufactured by Wako Pure Chemical Industries, Ltd.].

Examples of commercially available organic peroxide thermal polymerization initiators include, but not limited to, Perkadox (registered trademark) CH, Perkadox BC-FF, Perkadox 14, Perkadox 16, Trigonox (registered trademark) 22, Trigonox 23, Trigonox 121, Kayaester (registered trademark) P, Kayaester O, and Kayabutyl (registered trademark) B [all of which are manufactured by Kayaku Akzo Corporation], and PERHEXA (registered trademark) HC, PERCUMYL (registered trademark) H, PEROCTA (registered trademark) O, PERHEXYL (registered trademark) O, PERHEXYL Z, PERBUTYL (registered trademark) O, and PERBUTYL Z [all of which are manufactured by NOF CORPORATION].

Examples of the photopolymerization initiator include alkylphenones, benzophenones, acylphosphine oxides, Michler's benzoylbenzoates, oxime esters, tetramethylthiuram monosulfides, and thioxanthones.

In particular, a photocleavage-type photo-radical polymerization initiator is preferred. Examples of the photocleavage-type photo-radical polymerization initiator include those described in "SAISHIN UV KOUKA GIJUTSU (Latest UV Curing Technology)" (p. 159, issuer: Kazuhiro Takausu, published by TECHNICAL INFORMATION INSTITUTE CO., LTD, 1991).

Examples of commercially available photo-radical polymerization initiators include IRGACURE (registered trademark) 127, IRGACURE 184, IRGACURE 369, IRGACURE 651, IRGACURE 500, IRGACURE 819, IRGACURE 907, IRGACURE 784, IRGACURE 2959, IRGACURE CGI1700, IRGACURE CGI1750, IRGACURE CGI1850, IRGACURE CG24-61, IRGACURE TPO, Darocur (registered trademark) 1116, and Darocur 1173 [all of which are manufactured by BASF Japan Ltd.], and ESACURE KIP150, ESACURE KIP65LT, ESACURE KIP100F, ESACURE KT37, ESACURE KT55, ESACURE KTO46, and ESACURE KIP75 [all of which are manufactured by Lamberti].

When a polymerization initiator is added, the polymerization initiator may be used singly, or two or more may be used in combination. The amount added is 0.1 part by mass to 20 parts by mass, and further preferably 0.3 part by mass to 10 parts by mass with respect to 100 parts by mass of the reactive silicone compound (a) or 100 parts by mass of the reactive silicone compound (x).

<(c) Sulfur Compound>

The cladding-forming composition as well as the core-forming composition may include, as a component (c), at least one sulfur compound selected from the group consisting of thiol compounds and disulfide compounds, in addition to the component (a) and the component (b) [or the component (x) and the component (y)].

[Thiol Compound]

In the component (c) used in the present invention, examples of the thiol compounds include mercaptocarboxylic acid esters, such as methyl mercaptoacetate, methyl 3-mercaptopropionate, 4-methoxybutyl 3-mercaptopropionate, 2-ethylhexyl 3-mercaptopropionate, n-octyl 3-mercaptopropionate, stearyl 3-mercaptopropionate, 1,4-bis(3-mercaptopropionyloxy)butane, 1,4-bis(3-mercaptobutyryloxy)butane, trimethylolethane tris(3-mercaptopropionate), trimethylolethane tris(3-mercaptobutyrate), trimethylolpropane tris(3-mercaptopropionate), trimethylolpropane tris(3-mercaptobutyrate), pentaerythritol tetrakis(3-mercaptopropionate), pentaerythritol tetrakis(3-mercaptobutyrate), dipentaerythritol hexakis(3-mercaptopropionate), dipentaerythritol hexakis(3-mercaptobutyrate), tris(2-(3-mercaptopropionyloxy)ethyl) isocyanurate, and tris(2-(3-mercaptobutyryloxy)ethyl) isocyanurate; mercaptoalkanes, such as ethyl mercaptan, 1,2-dimercaptoethane, 1,3-dimercaptopropane, tert-butyl mercaptan, n-dodecanethiol, and tert-dodecanethiol; mercapto alcohols, such as 2-mercaptoethanol and 4-mercapto-1-butanol; aromatic ring-containing mercaptans, such as thiophenol, benzylthiol, m-toluenethiol, p-toluenethiol, 2-naphthalenethiol, 2-pyridylthiol, 2-mercaptobenzimidazole, and 2-mercaptobenzothiazole; and silane-containing thiols, such as (γ-mercaptopropyl)trimethoxysilane and triethoxy(γ-mercaptopropyl)silane. Among them, mercaptoalkanes are preferred, and n-dodecanethiol is more preferred.

[Disulfide Compound]

In the component (c) used in the present invention, examples of the disulfide compounds include alkyl disulfides, such as diethyl disulfide, dipropyl disulfide, diisopropyl disulfide, dibutyl disulfide, di-tert-butyl disulfide, dipentyl disulfide, diisopentyl disulfide, dihexyl disulfide, dicyclohexyl disulfide, didecyl disulfide, di-tert-dodecyl disulfide, bis(2-hydroxyethyl) disulfide, and bis(2,2-diethoxyethyl) disulfide; aromatic ring-containing disulfides, such as diphenyl disulfide, ditolyl disulfide, dibenzyl disulfide, 2,2'-dipyridyl disulfide, 2,2'-dibenzimidazolyl disulfide, and 2,2'-dibenzothiazolyl disulfide; and thiuram disulfides, such as tetramethylthiuram disulfide, tetraethylthiuram disulfide, tetrabutylthiuram disulfide, and dipentamethylenethiuram disulfide. Among them, alkyl disulfides are preferred, and didecyl disulfide is more preferred.

When the component (c) is blended, the component (c) is included preferably in the amount of 0.01 part by mass to 5 parts by mass, and more preferably 0.1 part by mass to 1 part by mass, with respect to 100 parts by mass of the component (a) or 100 parts by mass of the component (x).

In the present invention, as the component (c), a thiol compound may be used singly or two or more thereof may be used in combination, a disulfide compound may be used singly or two or more thereof may be used in combination, or one or more thiol compounds and one or more disulfide compounds may be used in combination. When different kinds of compounds are used as the component (c), the total amount of the different kinds of compounds blended is within the range of the amount described above.

<Silane Coupling Agent (d)>

The cladding-forming composition as well as the core-forming composition may include a silane coupling agent as a component (d), in addition to the component (a) and the component (b) [or the component (x) and the component (y)].

Examples of the silane coupling agent include vinyl silane coupling agents, such as trimethoxy(vinyl)silane, triethoxy (vinyl)silane, trimethoxy(4-vinylphenyl)silane, and triethoxy(4-vinylphenyl)silane; (meth)acrylic silane coupling agents, such as 3-(meth)acryloyloxypropyltrimethoxysilane, triethoxy(3-(meth)acryloyloxypropyl)silane, 3-(meth)acryloyloxypropyl(dimethoxy)(methyl)silane, and diethoxy(3-(meth)acryloyloxypropyl)(methyl)silane; epoxy silane coupling agents, such as 3-glycidyloxypropyltrimethoxysilane, triethoxy(3-glycidyloxypropyl)silane, 3-glycidyloxypropyl (dimethoxy)(methyl)silane, diethoxy(3-glycidyloxypropyl) (methyl)silane, 2-(3,4-epoxycyclohexyl)ethyltrimethoxysilane, and 2-(3,4-epoxycyclohexyl)ethyltriethoxysilane; amine silane coupling agents, such as 3-aminopropyltrimethoxysilane, 3-aminopropyltriethoxysilane, N-(2-aminoethyl)-3-aminopropyltrimethoxysilane, N-(2-aminoethyl)-3-aminopropyltriethoxysilane, N-(2-aminoethyl)-3-aminopropyl(dimethoxy)(methyl)silane, N-(2-aminoethyl)-3-aminopropyl(diethoxy)(methyl)silane, N-(1-methylpentylidene)-3-trimethoxysilylpropylamine, 3-triethoxysilyl-N-(1-methylpentylidene)propylamine, N-(1,3-dimethylbutylidene)-3-trimethoxysilylpropylamine, N-(1,3-dimethylbutylidene)-3-triethoxysilylpropylamine, N-phenyl-3-aminopropyltrimethoxysilane, and N-phenyl-3-aminopropyltriethoxysilane; ureido silane coupling agents, such as 3-ureidopropyltrimethoxysilane and triethoxy(3-ureidopropyl)silane; mercapto silane coupling agents, such as 3-mercaptopropyltrimethoxysilane, triethoxy(3-mercaptopropyl)silane, (3-mercaptopropyl)(dimethoxy)(methyl)silane, and diethoxy(3-mercaptopropyl)(methyl)silane; sulfide silane coupling agents, such as bis(3-trimethoxysilylpropyl) tetrasulfide and bis(3-triethoxysilylpropyl) tetrasulfide; and isocyanate silane coupling agents, such as 3-isocyanatopropyltrimethoxysilane and triethoxy(3-isocyanatopropyl)silane.

Among them, 3-(meth)acryloyloxypropyltrimethoxysilane, triethoxy(3-(meth)acryloyloxypropyl)silane, 3-aminopropyltrimethoxysilane, 3-aminopropyltriethoxysilane, N-phenyl-3-aminopropyltrimethoxysilane, N-phenyl-3-aminopropyltriethoxysilane, 3-mercaptopropyltrimethoxysilane, and triethoxy(3-mercaptopropyl)silane are preferred.

When the silane coupling agent (d) is blended, the silane coupling agent may be used singly, or two or more kinds may be used in combination. The amount blended is 0.1 part by mass to 20 parts by mass, and further preferably 0.1 part by mass to 5 parts by mass with respect to 100 parts by mass of the component (a) or 100 parts by mass of the component (x).

<Other Components Optionally Blended>

The cladding-forming composition as well as the core-forming composition may additionally include a cross-linking agent, a surfactant, a leveling agent, an antioxidant, an photostabilizer, and the like, as appropriate without affecting the performance of the cladding material or the core material of the optical waveguide.

<Preparation Process of Cladding-Forming Composition and Core-Forming Composition>

The process for the cladding-forming composition as well as the core-forming composition is not limited to a particular process. For example, the component (a) and the component (b) [or the component (x) and the component (y)], and, if necessary, the component (c), the component (d), and other additives, such as a polymerization initiator are mixed to prepare a homogeneous solution, or a commonly used solvent may be used in addition to those components.

When a solvent is used, the proportion of a solid content in the cladding-forming composition or the core-forming composition is not limited as long as the components are uniformly dissolved in the solvent. For example, the solid content is 1% by mass to 50% by mass, or 1% by mass to 30% by mass, or 1% by mass to 25% by mass. Here, the solid content is the content obtained by removing the solvent component from all the components of the cladding-forming composition or the core-forming composition.

The solution of the cladding-forming composition or the core-forming composition is preferably used after being filtered using a filter having a pore size of 0.05 µm to 5 µm.

It is preferable that the cladding-forming composition as well as the core-forming composition in the present invention has a viscosity with excellent processability in formation of an optical waveguide by the production method in the present invention.

For example, it is preferable that the viscosity of the cladding-forming composition is 500 to 20,000 mPa·s at 25° C., and the viscosity of the core-forming composition is 1,000 to 100,000 mPa·s at 25° C.

EXAMPLES

Although the present invention will be described more specifically below with examples, the present invention is not limited to the following examples.

In the examples, the apparatuses and the conditions for preparation of samples and analysis of physical properties are as follows.

(1) Stirring and Defoaming Machine

Apparatus: planetary centrifugal mixer Awatori Rentaro (registered trademark) ARE-310 manufactured by THINKY CORPORATION (2) UV Exposure Apparatus: batch process UV radiation apparatus (high-pressure mercury lamp 2 kW×1 lamp) manufactured by EYE GRAPHICS CO., LTD.

(3) $^1$H NMR
Apparatus: AVANCE III HD manufactured by Burker
Measurement frequency: 500 MHz
Measurement solvent: CDCl$_3$
Reference substance: tetramethylsilane (0.00 ppm)
(4) Gel Permeation Chromatography (GPC)
Apparatus: Prominence (registered trademark) GPC system manufactured by Shimadzu Corporation
Column: Shodex (registered trademark) GPC KF-804L and GPC KF-803L manufactured by SHOWA DENKO K.K.
Column temperature: 40° C.
Solvent: tetrahydrofuran
Detector: RI
Calibration curve: standard polystyrene
(5) Viscosity
Apparatus: MCR rheometer MCR302 manufactured by Anton Paar
Measuring system: cone plate (diameter 25 mm, angle 2 degrees)
Temperature: 25° C.
Number of revolutions: 1 rpm
Wait time: 5 minutes
(6) Refractive Index
Apparatus: Model 2010/M prism coupler manufactured by Metricon Corporation
(7) 5% Weight Loss Temperature (Td$_{5\%}$)
Apparatus: TG/DTA 2000SA manufactured by Bruker AXS K.K.
Measuring condition: under nitrogen atmosphere
Temperature increase rate: 10° C./min (25° C. to 450° C.)
(8) Digital Microscope
Apparatus: VHX-500F manufactured by KEYENCE CORPORATION
(9) Near Field Pattern
Light source: LED light source LDS 1007 manufactured by Precise Gauges Co., Ltd.
Incident probe: SI-type quartz multimode fiber AFS50/125Y manufactured by Fiberguide Industries Limited (core diameter 50 µm, length 1 m, FC connectors on both ends (flat polish))
Beam profiler: BeamStar FX50 manufactured by Ophir Optronics Solutions Ltd.
(10) Propagation Loss
Light source: white light source AQ-4303B manufactured by Ando Electric Co., Ltd.
Incident probe: GI-type multimode fiber manufactured by Furukawa Electric Co., Ltd. (core diameter 25 µm, length 1 m, FC connectors on both ends (flat polish))
Emission probe: SI-type quartz multimode fiber AFS105/125Y manufactured by Fiberguide Industries Limited (core diameter 105 µm, length 2 m, FC connectors on both ends (flat polish))
Detector: Optical spectrum analyzer AQ-6315B manufactured by Ando Electric Co., Ltd.

Abbreviations represent the following meaning.
DPSD: diphenylsilanediol [manufactured by Tokyo Chemical Industry Co., Ltd.]
STMS: trimethoxy(4-vinylphenyl)silane [manufactured by Shin-Etsu Chemical Co., Ltd.]
BPE: ethoxylated bisphenol A diacrylate (10 mol of ethoxy group added) [NK Ester A-BPE-10 manufactured by Shin-Nakamura Chemical CO., Ltd]
DOG: dioxane glycol diacrylate [NK Ester A-DOG manufactured by Shin-Nakamura Chemical CO., Ltd]
TEG: tetraethylene glycol diacrylate [NK Ester A-200 manufactured by Shin-Nakamura Chemical Co., Ltd.]
DVB: divinylbenzene [DVB-810 manufactured by NIPPON STEEL & SUMIKIN CHEMICAL CO., LTD., purity 81%]
I127: 2-hydroxy-1-(4-(4-(2-hydroxy-2-methylpropionyl)benzyl)phenyl)-2-methylpropan-1-one [IRGACURE (registered trademark) 127 manufactured by BASF Japan Ltd.]
TPO: diphenyl(2,4,6-trimethylbenzoyl)phosphine oxide [IRGACURE (registered trademark) TPO manufactured by BASF Japan Ltd.]
W712: epoxy siloxane resin [FX-W712 manufactured by ADEKA CORPORATION]
W713: epoxy siloxane resin [FX-W713 manufactured by ADEKA CORPORATION]

Production Example 1

Production of Reactive Silicone Compound (SC1)

In a 200-mL eggplant flask with a condenser and a Dean-Stark apparatus, 43.3 g (0.20 mol) of DPSD, 44.9 g (0.20 mol) of STMS, and 35 g of toluene were charged, and the air in the flask was purged with nitrogen using a nitrogen balloon. After this reaction mixture was heated to 50° C., 38 mg (0.2 mmol) of barium hydroxide monohydrate [manufactured by Aldrich] was added and stirred at 50° C. for one hour. After heating to 85° C., dealcoholation condensation was performed by stirring the mixture for five hours while removing byproduct methanol out of the system. The reaction mixture was cooled to room temperature (about 23° C.), and an insoluble matter was removed using a membrane filter having a pore size of 0.2 µm. Toluene was distilled off under a reduced pressure at 50° C. from this reaction mixture using a rotary evaporator to yield 74.9 g of a colorless transparent oily product that is a reactive silicone compound (SC1).

Figure 15:
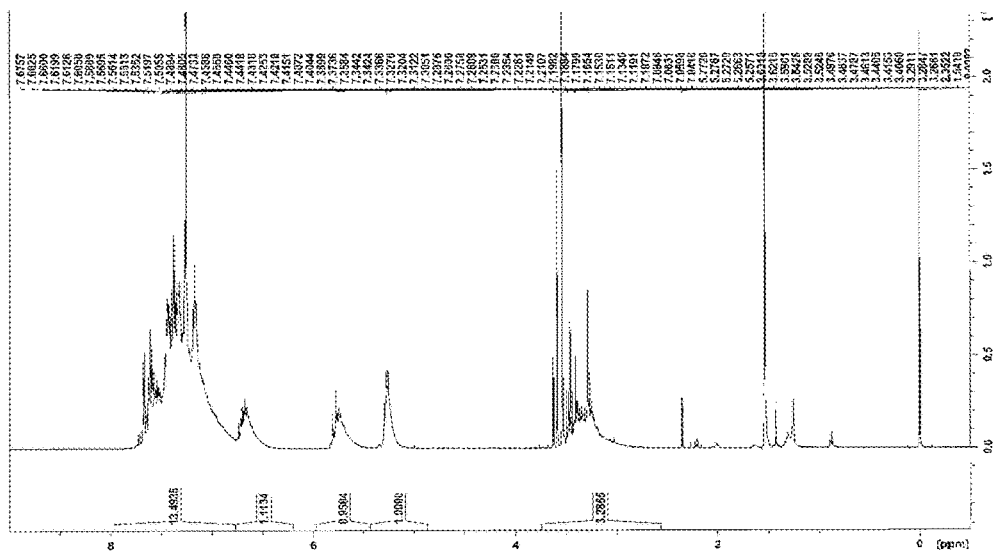
FIG. 15 is a diagram illustrating the $^1$H NMR spectrum of a reactive silicone compound (SC1) obtained in Production Example 1.

The $^1$H NMR spectrum of the resultant reactive silicone compound is illustrated in FIG. 15. The weight average molecular weight Mw measured by GPC in terms of polystyrene is 1,570, and the degree of distribution: Mw (weight average molecular weight)/Mn (number average molecular weight) is 1.2.

Production Example 2

Production of Reactive Silicone Compound (SC2)

In a 1-L eggplant flask with a condenser, 177 g (0.80 mol) of DPSD, 179 g (0.80 mol) of STMS, and 141 g of toluene were charged, and the air in the flask was purged with nitrogen using a nitrogen balloon. After this reaction mixture was heated to 50° C., 0.303 g (1.6 mmol) of barium hydroxide monohydrate [manufactured by Aldrich] was added and further stirred at 50° C. for two days to perform dealcoholation condensation. The reaction mixture was cooled to room temperature (about 23° C.), and an insoluble matter was removed using a membrane filter having a pore size of 0.2 µm. Toluene and byproduct methanol were distilled off under a reduced pressure at 50° C. from this reaction mixture using a rotary evaporator to yield 305 g of a colorless transparent oily product that is a reactive silicone compound.

Figure 16:
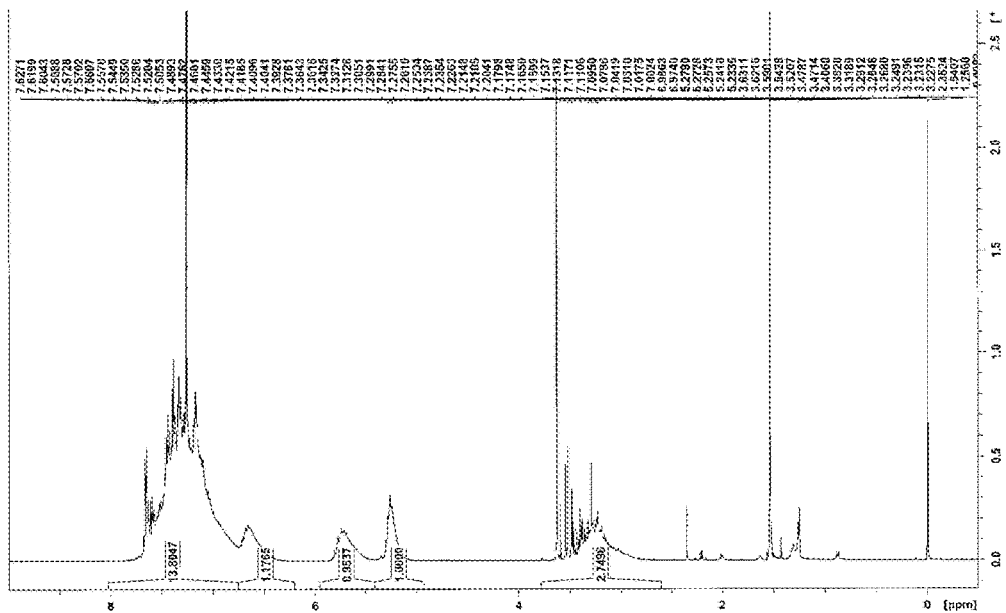
FIG. 16 is a diagram illustrating the $^1$H NMR spectrum of a reactive silicone compound (SC2) obtained in Production Example 2.

The $^1$H NMR spectrum of the resultant reactive silicone compound is illustrated in FIG. 16. The weight average molecular weight Mw measured by GPC in terms of polystyrene is 1,270, and the degree of distribution Mw/Mn is 1.2.

Production Example 3

Preparation of Polymerizable Composition 1

Seventy-five parts by mass of SC1 produced in Production Example 1 as the reactive silicone compound (a), 25 parts by mass of DOG as the di(meth)acrylate compound (b), and 1 part by mass of I127 and 1 part by mass of TPO as polymerization initiators were stirred and mixed at 50° C. for three hours. The mixture was further stirred and defoamed for two minutes to prepare a polymerizable composition 1. The viscosity of the resultant composition at 25° C. was 3,800 mPa·s.

Production Example 4

Preparation of Polymerizable Composition 2

A polymerizable composition 2 was prepared by performing the same operation as in Production Example 3 except that the composition was changed as described in Table 1. In Table 1, "part" represents "part(s) by mass".

The viscosity of the resultant composition at 25° C. was 9,000 mPa·s.

Comparative Production Examples 1 and 2

Preparation of Polymerizable Compositions 3 and 4

Polymerizable compositions 3 and 4 were prepared by performing the same operation as in Production Example 3 except that the composition was changed as described in Table 1.

[Evaluation of Refractive Index of Cured Product]

Each polymerizable composition was put on a silicon wafer, with 50 μm-thick Kapton (registered trademark) tape affixed as a spacer, and sandwiched with a glass substrate subjected to release treatment in advance. The sandwiched polymerizable composition was exposed to UV at 20 mW/cm² for 60 seconds. After the glass substrate holding the polymerizable composition was removed, the composition was heated on a hot plate at 150° C. for 20 minutes to fabricate a cured product.

The refractive index of the resultant cured product was measured. The result is also listed in Table 1.

[Evaluation of Heat Resistance of Cured Product]

Each polymerizable composition was sandwiched together with a 200 μm-thick silicone rubber spacer between two glass substrates subjected to release treatment in advance. The sandwiched polymerizable composition waexposed to UV at 20 mW/cm² for 60 seconds, and the cured s product was removed from the glass substrates to fabricate a cured product.

The 5% weight loss temperature ($Td_{5\%}$) of the resultant cured product was measured to evaluate the heat resistance. The result is also listed in Table 1.

TABLE 1

| Production Example | Polymerizable composition | SC1 [parts] | Di(meth)-acrylate | [part] | I127 [part] | TPO [part] | Refractive index 833 nm | Refractive index 1,305 nm | Refractive index 1,551 nm | $Td_{5\%}$ [° C.] |
|---|---|---|---|---|---|---|---|---|---|---|
| Production Example 3 | Polymerizable Composition 1 | 75 | DOG | 25 | 1 | 1 | 1.558 | 1.550 | 1.549 | 351 |
| Production Example 4 | Polymerizable Composition 2 | 87.5 | DOG | 12.5 | 1 | 1 | 1.567 | 1.559 | 1.558 | — |
| Comparative Production Example 1 | Polymerizable Composition 3 | 80 | TEG | 20 | 1 | 1 | 1.564 | 1.556 | 1.554 | 327 |
| Comparative Production Example 2 | Polymerizable Composition 4 | 67 | BPE | 33 | 1 | 1 | 1.565 | 1.557 | 1.556 | 315 |

As listed in Table 1, it has been confirmed that when a polymerizable composition is prepared such that the refractive index of its cured product is substantially equal, blending the di(meth)acrylate compound of Formula [3] yields a cured product that has a high $Td_{5\%}$, that is, high heat resistance, compared with other (meth)acrylate compounds.

[Production Example 5] Preparation of Polymerizable Composition 5

Ninety-nine point four (99.4) parts by mass of SC2 produced in Production Example 2 as the reactive silicone compound (x), 0.6 part by mass of DVB as the aromatic vinyl compound (y), and 1 part by mass of TPO as a polymerization initiator were stirred and mixed at 50° C. for three hours. The mixture was further stirred and defoamed for two minutes to prepare a polymerizable composition 5.

The viscosity of the resultant composition at 25° C. was 80,800 mPa·s. The refractive index of the cured product prepared in the same manner as in the foregoing [Evaluation of Refractive Index of Cured Product] was 1.586 (833 nm), 1.577 (1,305 nm), and 1.575 (1,551 nm).

[Example 1] Fabrication of GI Optical Waveguide

An optical waveguide including cores of 12 channels formed in cladding was fabricated under the conditions described in Table 2. The specifics are described below (see FIG. 1 to FIG. 5).

On a glass plate (FIG. 1: bottom plate 92) with a length of 3 cm, a width of 15 cm, and a thickness of 3 mm, a 500 μm-thick silicone rubber sheet (FIG. 1: outer frame 93) having an opening (FIG. 1: opening 93a) with a length of 1 cm and a width of 10 cm at the center was affixed, and the polymerizable composition 1 was filled as a cladding material in the opening. In so doing, the cladding material was filled at an angle of 45 degrees in the horizontal direction and left for 30 minutes so that the cladding material was uniformly filled in the opening. Uncured cladding (FIG. 2: uncured cladding 19A) was thus obtained.

The glass plate filled with this cladding material was attached to the work table of a tabletop application robot

[SHOTmini SL 200DS manufactured by Musashi Engineering, Inc.]. In a 5-mL UV block syringe [PSY-5E manufactured by Musashi Engineering, Inc.] (FIG. 3: ejection unit 94), the polymerizable composition 5 was filled as a core material and defoamed. A metal needle [SN-32G-LF manufactured by Musashi Engineering, Inc.] having an inner diameter of 100 μm (FIG. 3: needle-like portion 96) was connected to the syringe ejection portion (FIG. 3: ejection body 95) and then attached to the tabletop application robot.

Subsequently, the position of the ejection portion was adjusted such that the height from the upper surface of the glass substrate to the tip end of the metal needle (FIG. 3: $H_1$) was 300 μm. Thereafter, the ejection pressure of a dispenser [ML-808FXcom manufactured by Musashi Engineering, Inc.] was set to 600 kPa, and the drawing operation speed of the tabletop application robot (the moving speed of the ejection unit) was set to 4 mm/sec. The ejection program of the tabletop application robot was operated, and the polymerizable composition 5 serving as a core material was ejected into the polymerizable composition 1 serving as a cladding material such that the length of the optical waveguide was 8.5 cm at a position where the height from the upper surface of the glass substrate to the tip end of the metal needle was 300 μm. An uncured core (FIG. 4: uncured core 11A) was thus formed. This operation was repeated with 300 μm pitches of uncured cores to form uncured cores of 12 channels (see FIG. 5. FIG. 5 illustrates formation of up to 4 channels of uncured cores). Immediately after the drawing of the uncured core of the twelfth channel was finished, the UV-LED (wavelength at 365 nm) installed in the tabletop application robot swept three times with an illumination of 10 mW/cm$^2$ (detected at 365 nm) and a rate of 1 mm/sec, to cure the uncured cores and the uncured cladding, yielding cores and cladding. Through this operation, the cores of 12 channels can be varied in the wait time before exposure from drawing to curing. The wait time for the core of the twelfth channel was 0 second, and the wait time for the core of the first channel was 261 seconds. The difference in wait time between adjacent cores was 23.7 seconds.

Subsequently, after the silicone rubber sheet was removed from the glass substrate using a razor, heating was performed with an oven at 150° C. for 20 minutes. The section of the optical waveguide was exposed using a razor, and the end surfaces were polished with sandpaper for optical fibers to obtain a 5 cm-long GI optical waveguide.

Figure 17:
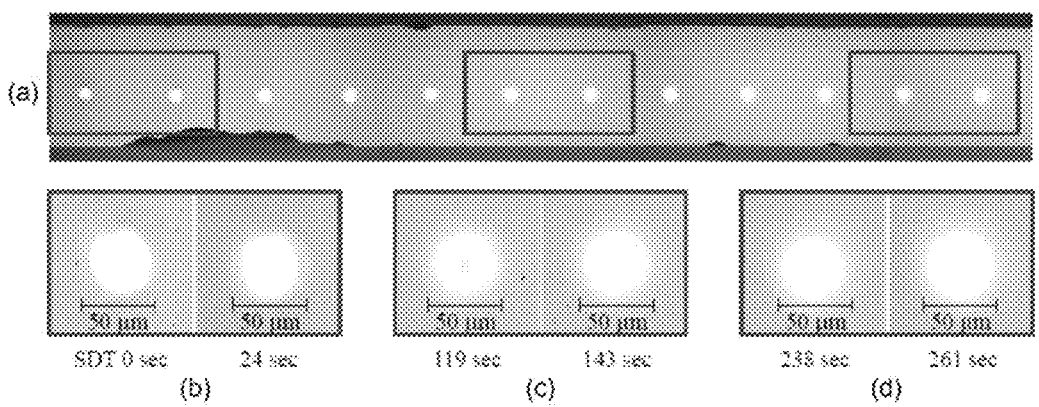
FIG. 17 is a sectional photograph illustrating the observation result (transmission mode) of an optical waveguide fabricated in Example 1 with a digital microscope.

The fabricated optical waveguide was set vertically in a digital microscope and illuminated with light from a white light source below, and the optical waveguide was observed in a transmission mode. The result is illustrated in FIG. 17 [FIG. 17(a) is an overall core cross-sectional view of 12 channels, FIG. 17(b) is an enlarged core cross-sectional view of the twelfth channel (wait time 0 second) and the eleventh channel (wait time 24 seconds), FIG. 17(c) is an enlarged core cross-sectional view of the seventh channel (wait time 119 seconds) and the sixth channel (wait time 143 seconds), and FIG. 17(d) is an enlarged core cross-sectional view of the second channel (wait time 238 seconds) and the first channel (wait time 261 seconds).

All of the cores are shaped in a perfect circle having a diameter of about 50 μm, and it has been confirmed that they each have a suitable size for a multimode optical waveguide.

Figure 18:
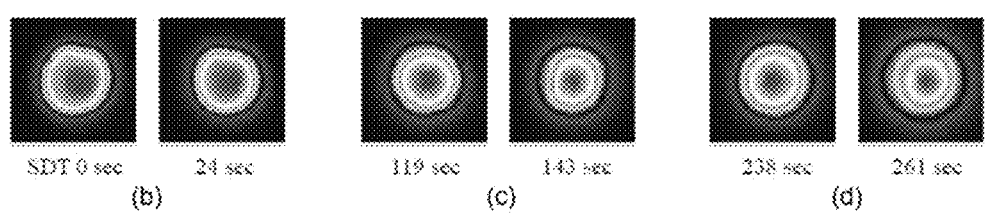
FIG. 18 is a sectional photograph illustrating the observation result of an emission near field pattern of the optical waveguide fabricated in Example 1.

Next, the emission near field pattern (NFP) of the fabricated optical waveguide was observed. The result is illustrated in FIG. 18 [FIG. 18(b) is an enlarged core cross-sectional view of the twelfth channel (wait time 0 second) and the eleventh channel (wait time 24 seconds), FIG. 18(c) is an enlarged core cross-sectional view of the seventh channel (wait time 119 seconds) and the sixth channel (wait time 143 seconds), and FIG. 18(d) is an enlarged core cross-sectional view of the second channel (wait time 238 seconds) and the first channel (wait time 261 seconds). The center of each image exhibits a darker color as the intensity of incident light beams is higher. As a result, it has been confirmed that when the wait time is set to 119 seconds or longer, light concentrates on the core center and that a GI optical waveguide is formed.

Comparative Example 1

Fabrication of GI Optical Waveguide

An optical waveguide including a core of one channel formed in cladding was fabricated by performing the same operation as in Example 1 except that the conditions were changed to those described in Table 2.

Figure 19:
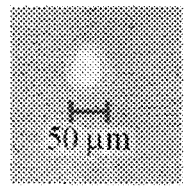
FIG. 19 is a sectional photograph illustrating the observation result (transmission mode) of an optical waveguide fabricated in Comparative Example 1 with a digital microscope.

The fabricated optical waveguide was observed with a digital microscope in the same manner as in Example 1. The result is illustrated in FIG. 19. All of the cores are shaped in a perfect circle having a diameter of about 50 m, and it has been confirmed that they have a suitable size for a multimode optical waveguide.

[Propagation Loss]

The propagation loss of the first channel of the optical waveguide fabricated in Example 1 and the optical waveguide fabricated in Comparative Example 1 was measured. In the measurement, the cut-back method was used, in which insertion loss was measured at a plurality of optical waveguide lengths, the x axis represents the optical waveguide length, the y axis represents the insertion loss, and the inclination indicates propagation loss. The propagation loss at each of the wavelengths 850 nm, 1,310 nm, and 1,550 nm of the optical communication wavelength range are summarized in Table 3.

TABLE 2

| Example/ Comparative Example | Core material | Cladding material | Ejection pressure of core material | Moving speed of ejection unit | Metal needle inner diameter | Metal needle height | Pitch between channels |
|---|---|---|---|---|---|---|---|
| Example 1 | Polymerizable Composition 5 | Polymerizable Composition 1 | 600 kPa | 4 mm/sec | 100 μm | 300 μm | 300 μm |
| Comparative Example 1 | W712 | W713 | 250 kPa | 8 mm/sec | 190 μm | 300 μm | — |

TABLE 3

| Example/Comparative Example | Propagation loss [dB/cm] | | |
| --- | --- | --- | --- |
| | 850 nm | 1,310 nm | 1,550 nm |
| Example 1 | 0.08 | 0.25 | 0.56 |
| Comparative Example 1 | 0.03 | 0.34 | 1.25 |

As listed in Table 3, it has been confirmed that the optical waveguide obtained by the production method in the present invention has an extremely low propagation loss in the optical communication wavelength band of long wavelengths, such as 1,310 nm and 1,550 nm. On the other hand, in the optical waveguide (Comparative Example 1) formed from the epoxy siloxane resin, increase of propagation loss was observed at the wavelengths longer than 1,310 nm, and it has been found that the characteristics for optical waveguides are not satisfied.

Example 2

Fabrication of GI Optical Waveguide

An optical waveguide including cores of 10 channels formed in cladding was fabricated by performing the same operation as in Example 1 except that the conditions were changed to those described in Table 4. The wait time for the core of the tenth channel was 0 second, the wait time for the core of the first channel was 61.1 seconds, and the difference in wait time between adjacent cores was 6.79 seconds.

Figure 20:
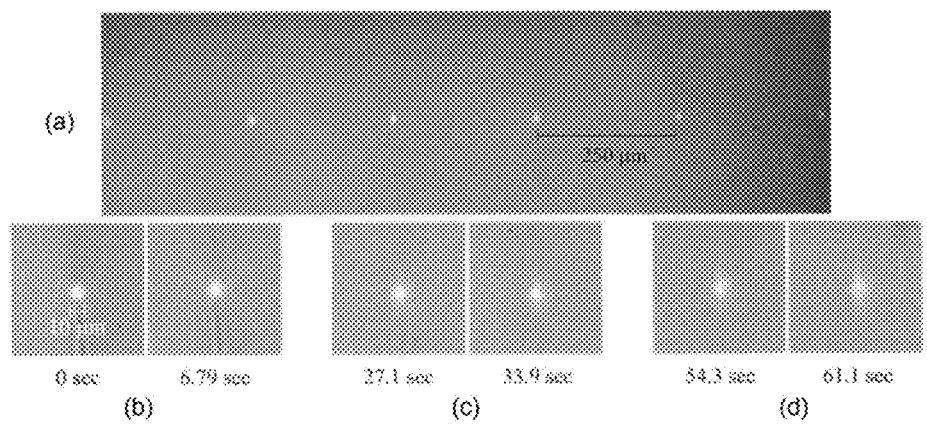
FIG. 20 is a sectional photograph illustrating the observation result (transmission mode) of an optical waveguide fabricated in Example 2 with a digital microscope.

The fabricated optical waveguide was observed with a digital microscope in the same manner as in Example 1. The result is illustrated in FIG. 20 [FIG. 20(a) is a core cross-sectional view, FIG. 20(b) is an enlarged core cross-sectional view of the tenth channel (wait time 0 second) and the ninth channel (wait time 6.79 seconds), FIG. 20(c) is an enlarged core cross-sectional view of the sixth channel (wait time 27.1 seconds) and the fifth channel (wait time 33.9 seconds), and FIG. 20(d) is an enlarged core cross-sectional view of the second channel (wait time 54.3 seconds) and the first channel (wait time 61.1 seconds).

All of the cores are shaped in a perfect circle having a diameter of about 10 μm, and it has been confirmed that they have a suitable size for a single-mode optical waveguide.

TABLE 4

| Example/Comparative Example | Core material | Cladding material | Core material ejection pressure | Moving speed of ejection unit | Metal needle inner diameter | Metal needle height | Pitch between channels |
| --- | --- | --- | --- | --- | --- | --- | --- |
| Example 2 | Polymerizable Composition 5 | Polymerizable Composition 2 | 50 kPa | 15 mm/sec | 100 μm | 300 μm | 250 μm |

Production Example 6

Preparation of Polymerizable Composition 6

Ninety-two parts by mass of SC1 produced in Production Example 1 as the reactive silicone compound (a), 4 parts by mass of DOG as the di(meth)acrylate compound (b), 4 parts by mass of DVB as the aromatic vinyl compound (y), and 1 part by mass of 1127 and 1 part by mass of TPO as polymerization initiators were stirred and mixed at 50° C. for 3 hours. The mixture was further stirred and defoamed for two minutes to prepare a polymerizable composition 6.

The viscosity of the resultant composition at 25° C. was 3,400 mPa·s. The refractive index of the cured product fabricated in the same manner as in the foregoing [Evaluation of Refractive Index of Cured Product] was 1.578 (833 nm), 1.568 (1,305 nm), and 1.567 (1,551 nm).

Example 3

Fabrication of GI Optical Waveguide

An optical waveguide including cores of four channels× two levels formed in cladding was fabricated by performing the same operation as in Example 1 except that the conditions were changed to those described in Table 5. The cores on the upper level of two levels were formed above the lower level after the cores of four channels on the lower level were formed.

Figure 21:
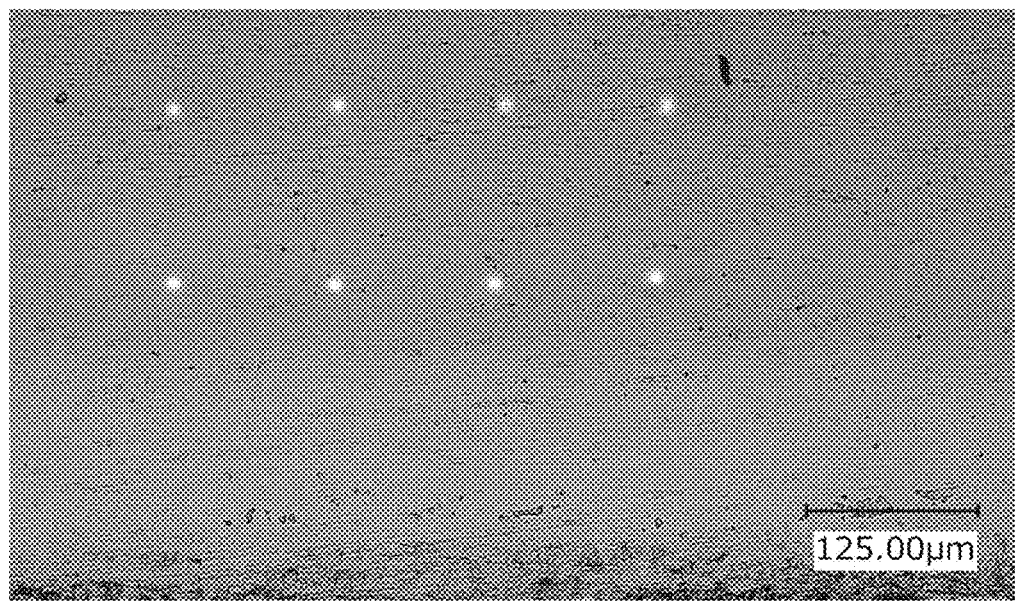
FIG. 21 is a sectional photograph illustrating the observation result (transmission mode) of an optical waveguide fabricated in Example 3 with a digital microscope.

The fabricated optical waveguide was observed with a digital microscope in the same manner as in Example 3. The result is illustrated in FIG. 21.

All of the cores are shaped in a perfect circle having a diameter of about 10 m, and it has been confirmed that they have a suitable size for a single-mode optical waveguide.

TABLE 5

| Example/ Comparative Example | Core material | Cladding material | Core material ejection pressure | Moving speed of ejection unit | Metal needle inner diameter | Metal needle height | Pitch between channels |
|---|---|---|---|---|---|---|---|
| Example 3 | Polymerizable Composition 5 | Polymerizable Composition 6 | 500 kPa | 40 mm/sec | 100 μm | Upper level: 400 μm Lower level: 270 μm | 125 μm |

As described above, the production method for an optical waveguide according to the present invention can fabricate not only a multimode optical waveguide but also a single-mode GI optical waveguide with an extremely small diameter, and the optical waveguide has high heat resistance to 350° C. or higher and extremely high transparency (low propagation loss) in the long wavelength range. The resultant optical waveguide is workable for use on an optoelectronic circuit board.

DESCRIPTION OF THE REFERENCE NUMERALS 10, 20, 30 optical waveguide
11, 12, 13, 14, 21 (21a to 21e), 22, 23, 24 31, 32, 33, 34, 35 (35a to 35i), 36, 37, 38 core
11A, 12A, 13A, 14A uncured core
19 29 39 cladding
19A uncured cladding
91 support
92 bottom plate
93 outer frame
94 ejection unit
95 ejection body
96 needle-like portion
$H_1$ height

The invention claimed is:

1. A production method for an optical waveguide, the production method comprising:
a first step of inserting a needle-like portion at a tip end of an ejection unit into uncured cladding;
a second step of moving the needle-like portion in the uncured cladding while ejecting an uncured material from the needle-like portion to form an uncured core surrounded and covered with the uncured cladding;
a third step of removing the needle-like portion from the uncured cladding; and
a fourth step of curing the uncured cladding and the uncured core, wherein
the uncured cladding is composed of a composition including 100 parts by mass of a reactive silicone compound (a) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 1 part by mass to 200 parts by mass of a di(meth)acrylate compound (b) of Formula [3], and
the uncured core is composed of a composition including 100 parts by mass of a reactive silicone compound (x) composed of a polycondensate of a diarylsilicic acid compound A of Formula [1] and an alkoxy silicon compound B of Formula [2], or a polycondensate of the diarylsilicic acid compound A, the alkoxy silicon compound B, and another polycondensable compound, and 1 part by mass to 100 parts by mass of an aromatic vinyl compound (y) of Formula [4]:

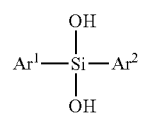
[1]

(wherein $Ar^1$ and $Ar^2$ are independently a phenyl group optionally substituted with a $C_{1-6}$ alkyl group, a naphthyl group optionally substituted with a $C_{1-6}$ alkyl group, or a biphenyl group optionally substituted with a $C_{1-6}$ alkyl group), $$Ar^3\text{—}Si(OR^1)_a R^2{}_{3-a} \quad [2]$$

(wherein $Ar^3$ is a phenyl group having at least one group having a polymerizable double bond, a naphthyl group having at least one group having a polymerizable double bond, or a biphenyl group having at least one group having a polymerizable double bond, $R^1$ is independently methyl group or ethyl group, $R^2$ is methyl group, ethyl group, or vinylphenyl group, and a is 2 or 3),

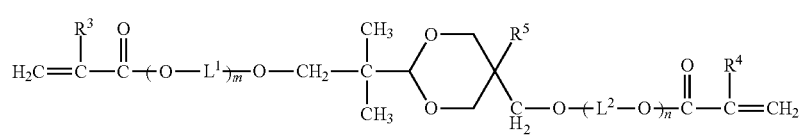
[3]

(wherein $R^3$ and $R^4$ are independently a hydrogen atom or methyl group, $R^5$ is a hydrogen atom, methyl group, or ethyl group, $L^1$ and $L^2$ are independently a $C_{2-6}$ alkylene group, and m and n are 0 or a positive integer, wherein m+n is 0 to 20),

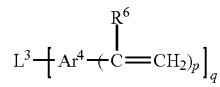
[4]

(wherein $R^6$ is a hydrogen atom or methyl group, $L^3$ is a single bond, a hydrogen atom, an oxygen atom, a $C_{1\text{-}20}$ q-valent aliphatic hydrocarbon residue optionally substituted with a phenyl group, or a $C_{1\text{-}20}$ q-valent aliphatic hydrocarbon residue optionally including an ether bond, $Ar^4$ is a p+1-valent aromatic hydrocarbon residue, p is independently 1 or 2, and q is an integer of 1 to 3 (wherein q is 1 when $L^3$ is a hydrogen atom, and q is 2 when $L^3$ is a single bond or an oxygen atom)).

2. The production method for an optical waveguide according to claim 1, wherein between the third step and the fourth step, the first step, the second step, and the third step are repeatedly performed as a sequential process to form a plurality of uncured cores surrounded and covered with the uncured cladding.

\* \* \* \* \*